US006376614B1

(12) United States Patent
Teshima et al.

(10) Patent No.: US 6,376,614 B1
(45) Date of Patent: *Apr. 23, 2002

(54) ETHYLENE COPOLYMER AND AROMATIC VINYL GRAFT COPOLYMER AND METHOD FOR PRODUCING THE SAME

(75) Inventors: Hideo Teshima; Masanori Sera, both of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/177,557

(22) Filed: Oct. 23, 1998

(30) Foreign Application Priority Data

Oct. 24, 1997 (JP) ............................................... 9-292348
Oct. 24, 1997 (JP) ............................................... 9-292349

(51) Int. Cl.⁷ ........................ C08F 257/00; C08F 236/20
(52) U.S. Cl. ........................ 525/242; 525/245; 525/247; 525/268; 526/134; 526/153; 526/159; 526/160; 526/165; 526/170; 526/336; 526/339; 526/340; 526/347

(58) Field of Search ................................. 526/160, 336, 526/347, 134, 153, 165, 159, 170, 339, 340; 525/245, 268, 324, 316, 242, 247

(56) References Cited

U.S. PATENT DOCUMENTS

| 2,989,515 | A | * | 6/1961 | Bruton et al. ............ 526/336 X |
| 5,250,629 | A | * | 10/1993 | Tani et al. ............... 525/245 X |
| 5,260,394 | A | * | 11/1993 | Tazaki et al. ................ 526/347 |
| 5,362,814 | A | * | 11/1994 | Machida et al. ............. 525/324 |
| 5,739,225 | A | * | 4/1998 | Tazaki et al. ................ 526/127 |

* cited by examiner

Primary Examiner—Fred Teskin
(74) Attorney, Agent, or Firm—Oblon, Spivak, McClelland, Maier & Neustadt, P.C.

(57) ABSTRACT

The present invention provides resin materials endowed with excellent heat resistance, solvent resistance, tensile elongation, toughness, and transparency. Specifically, there are provided an ethylene copolymer having a vinyl group attributed to a diene monomer in the molecular chain and comprising an aromatic vinyl monomer (A), ethylene (B) and a diene monomer (C), and an aromatic vinyl graft copolymer which is a graft copolymerization product of an aromatic vinyl monomer (H) and an ethylene copolymer macromer (I).

25 Claims, No Drawings

ETHYLENE COPOLYMER AND AROMATIC VINYL GRAFT COPOLYMER AND METHOD FOR PRODUCING THE SAME

BACKGROUND OF THE INVENTION

1. Field of the Invention

The present invention relates to an ethylene copolymer and an aromatic vinyl graft copolymer and a method for producing the same. More particularly, the present invention relates to a novel ethylene copolymer which has a vinyl group in the molecular chain, which is endowed with excellent toughness and compatibility as well as heat resistance and chemical resistance, and which is useful as a heat-resistant elastomer and a raw material of a composite material; to a syndiotactic aromatic vinyl copolymer containing a macromer formed of the ethylene copolymer (hereinafter may be simply referred to as ethylene copolymer macromer) as a graft component; and to a method for producing the same effectively.

2. Related Art

Previously, the present inventors successfully developed a styrene polymer having a high syndiotacticity (Japanese Patent Application Laid-Open (kokai) Nos. 62-104818 and 63-241009). The styrene polymer having a syndiotactic structure is endowed with excellent heat resistance and chemical resistance, but does not exhibit sufficient toughness or elongation. In addition, it has poor compatibility with other resins; therefore its use has inevitably been limited.

In order to overcome this drawback, the present inventors succeeded in endowing the aforementioned styrene polymer having a syndiotactic structure with toughness by copolymerizing styrene with an olefin (Japanese Patent Application Laid-Open (kokai) Nos. 3-7705, 4-130114, and 4-300904).

However, these polymers are not necessarily satisfactory in terms of toughness, elongation, and compatibility with other resins. Moreover, they sometimes suffer from deterioration of heat resistance. Therefore, there has been demand for a technique which further improves properties such as toughness which maintaining excellent a heat resistance.

Furthermore, there has been demand for a technique to effectively improve toughness and elongation of fragile resins having high glass transition temperature such as typical polystyrene as well as polystyrene having a syndiotactic structure.

The thus-obtained random or block copolymer of styrene and an olefin suffers insufficient controllability of the copolymerization composition as well as a low copolymerization-modification ratio (i.e., percentage of modifier olefins in the resultant copolymer), leading to insufficient improvement in toughness, elongation, and compatibility with other resins.

There have also been proposed graft copolymers in which a styrene monomer is graft-copolymerized with a polymer having double bonds in side chains, as well as block copolymers in which a styrene monomer is block-copolymerized with a macromonomer having polymerization-active terminal vinyl groups (Japanese Patent Application Laid-Open (kokai) Nos. 05-247147 and 05-295056). However, the copolymers disclosed in the above publications exhibit an insufficient graft ratio, resulting in insufficient improvement in physical properties thereof.

In view of the foregoing, the present invention is directed to the provision of an ethylene copolymer which is remarkably useful as a macromonomer for obtaining a syndiotactic polystyrene graft copolymer having improved toughness, elongation, etc. or as a material for obtaining a compatibility-enhancing agent for a composition containing syndiotactic polystyrene and a rubber component, or a composition of typical polystyrene and a rubber component; the provision of a syndiotactic aromatic vinyl graft copolymer which is endowed with excellent toughness, elongation, and compatibility as well as heat resistance and chemical resistance, and is useful for a heat-resistant elastomer and a raw material of composite materials; and the provision of a method for producing the same in an effective manner.

SUMMARY OF THE INVENTION

The present inventors carried out extensive studies, and as a result, found that introduction of a styrenic vinyl group into the ethylene chain may provide an effective comonomer for obtaining a polystyrene graft copolymer, and that the polystyrene graft copolymer may serve as a compatibility-enhancing agent for a composition containing polystyrene and a rubber component.

The present inventors also found that a graft copolymer which is obtained from an aromatic vinyl monomer and the aforementioned ethylene copolymer serving as a macromer and which contains an aromatic-vinyl-monomer-derived chain having a stereospecificity of highly syndiotactic structure is endowed with excellent toughness, elongation, and compatibility as well as heat resistance and chemical resistance.

Furthermore, the present inventors found that ethylene copolymers are effectively obtained by using a specific catalyst. The present invention was accomplished based on these findings.

Specifically, the present invention provides:

(1) an ethylene copolymer comprising an aromatic vinyl monomer (A), ethylene (B), and a diene monomer (C) and having in the molecular chain a vinyl group attributed to a diene monomer, wherein recurrent units attributed to aromatic vinyl monomer (A) is 1–98 mol %, recurrent units attributed to ethylene (B) is 1–98 mol %, and recurrent units attributed to diene monomer (C) is 0.001–10 mol %.

(2) an ethylene copolymer comprising an aromatic vinyl monomer (A), ethylene (B), a diene monomer (C), and α-olefin (D), and having in the molecular chain a vinyl group attributed to a diene monomer, wherein recurrent units attributed to aromatic vinyl monomer (A) is 1–98 mol %, recurrent units attributed to ethylene (B) is 1–98 mol %, recurrent units attributed to diene monomer (C) is 0.001–10 mol % and recurrent units attributed to α-olefin (D) is 0–90 mol % (exclusive of 0).

(3) the ethylene copolymer described in either one of the above-described (1) or (2), wherein the diene monomer (C) is a diene having a styrenic vinyl group.

(4) a method for producing an ethylene copolymer recited in either one of the above-described (1) through (3), wherein the respective monomers are copolymerized through use of a catalyst formed of the following components (E) and (F):

(E) a transition metal compound; and (F) an oxygen-containing compound (i) represented by the following formula (1) or (2):

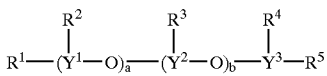

(1)

wherein, each of $R^1$ through $R^5$, which may be identical to or different from one another, represents a C1–C8 alkyl group; each of $Y^1$ through $Y^3$, which may be identical to or different from one another, represents a Group 13 element; and a and b independently represent numbers between 0 and 50 inclusive, with the proviso that a+b is equal to or greater than 1;

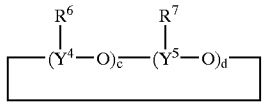

(2)

wherein, each of $R^6$ and $R^7$, which may be identical to or different from each other, represents a C1–C8 alkyl group; $Y^4$ and $Y^5$, which may be identical to or different from each other, represents a Group 13 element; and c and d independently represent numbers between 0 and 50 inclusive, with the proviso that c+d is equal to or greater than 1: and/or a compound (ii) capable of forming an ionic complex through reaction with transition metal compound (E).

(5) a method for producing an ethylene copolymer recited in either one of the above-described (1) through (3), wherein the respective monomers are copolymerized through use of a catalyst formed of the following components (E), (F) and (G):

(E) a transition metal compound;
(F) an oxygen-containing compound (i) represented by the following formula (1) or (2):

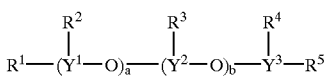

(1)

wherein, each of $R^1$ through $R^5$, which may be identical to or different from one another, represents a C1–C8 alkyl group; each of $Y^1$ through $Y^3$, which may be identical to or different from one another, represents a Group 13 element; and a and b independently represent numbers between 0 and 50 inclusive, with the proviso that a+b is equal to or greater than 1;

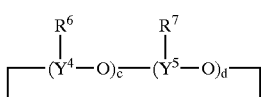

(2)

wherein, each of $R^6$ and $R^7$, which may be identical to or different from each other, represents a C1–C8 alkyl group; $Y^4$ and $Y^5$, which may be identical to or different from each other, represents a Group 13 element; and c and d independently represent numbers between 0 and 50 inclusive, with the proviso that c+d is equal to or greater than 1: and/or a compound (ii) capable of forming an ionic complex through reaction with transition metal compound (E): and (G) an alkylating agent.

(6) a method for producing an ethylene copolymer recited in either one of the above-described (1) through (3), wherein the transition metal compound (E) is represented by the following formula (3):

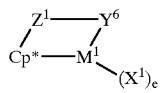

(3)

wherein $M^1$ represents titanium, zirconium, or hafnium; Cp* represents a cyclopentadienyl group or a substituted cyclopentadienyl group which is bonded to $M^1$ via a $\eta^5$ bonding mode, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, or a substituted octahydrofluorenyl group; $X^1$ represents a $\sigma$ ligand; e represents 1 or 2; a plurality of $X^1$ may be identical to or different from one another and may be linked together via an arbitrary group; $Y^6$ represents O, S, NR, PR, $CR_2$, or a neutral two-electron donor selected from OR, SR, $NR^2$, or $PR_2$; $Z^1$ represents $SiR_2$, $CR_2$, $SiR_2SiR_2$, $CR_2CR_2$, CR=CR, $CRSiR_2$, $GeR_2$, BR, or $BR_2$; R represents hydrogen, an alkyl group, an aryl group, a silyl group, a haloalkyl group, a haloaryl group, or a combination of at least two of the above groups selected so as to have 20 or fewer non-hydrogen atoms; and two or more of the above R may further form a condensed ring system with $Z^1$ or with $Y^6$ and $Z^1$.

(7) An aromatic vinyl graft copolymer which is a graft copolymerization product of an aromatic vinyl monomer (H) and ethylene copolymer macromer (I) and which has in the molecular chain a vinyl group attributed to a diene monomer; the ethylene copolymer (I) being obtained through copolymerization of an aromatic vinyl monomer (A), ethylene (B) and a diene monomer (C), wherein recurrent units attributed to aromatic vinyl monomer (A) is 1–98 mol %, recurrent units attributed to ethylene (B) is 1–98 mol %, and recurrent units attributed to diene monomer (C) is 0.001–10 mol %.

(8) an aromatic vinyl graft copolymer which is a graft copolymerization product of an aromatic vinyl monomer (H) and ethylene copolymer macromer (I) and which has in the molecular chain a vinyl group attributed to a diene monomer; the ethylene copolymer (I) being obtained through copolymerization of an aromatic vinyl monomer (A), ethylene (B), a diene monomer (C) and α-olefin (D), wherein recurrent units attributed to aromatic vinyl monomer (A) is 1–98 mol %, recurrent units attributed to ethylene (B) is 1–98 mol %, recurrent units attributed to diene monomer (C) is 0.001–10 mol % and recurrent units attributed to α-olefin (D) is 0–90 mol % (exclusive of 0).

(9) an aromatic vinyl graft copolymer described in either one of the above-described (7) or (8), wherein the diene monomer (C) is a diene having a styrenic vinyl group.

(10) an aromatic vinyl graft copolymer described in either one of the above-described (7) through (9), wherein a chain attributed to aromatic vinyl monomer (A) has a stereospecificity of highly syndiotactic structure .

(11) an aromatic vinyl graft copolymer described in either one of the above-described (7) through (10), wherein the ethylene copolymer macromer (I) is prepared by use of a catalyst formed of the following components (E) and (F):

(E) a transition metal compound;
(F) an oxygen-containing compound (i) represented by the following formula (1) or (2):

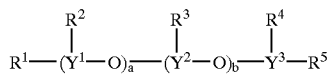
(1)

wherein, each of $R^1$ through $R^5$, which may be identical to or different from one another, represents a C1–C8 alkyl group; each of $Y^1$ through $Y^3$, which may be identical to or different from one another, represents a Group 13 element; and a and b independently represent numbers between 0 and 50 inclusive, with the proviso that a+b is equal to or greater than 1;

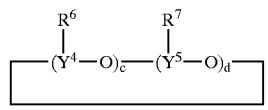
(2)

wherein, each of $R^6$ and $R^7$, which may be identical to or different from each other, represents a C1–C8 alkyl group; $Y^4$ and $Y^5$, which may be identical to or different from each other, represents a Group 13 element; and c and d independently represent numbers between 0 and 50 inclusive, with the proviso that c+d is equal to or greater than 1; and/or a compound (ii) capable of forming an ionic complex through reaction with transition metal compound (E).

(12) An aromatic vinyl graft copolymer described in either one of the above-described (7) or (10), wherein the ethylene copolymer macromer (I) is prepared by use of a catalyst formed of the following components (E), (F) and (G):
(E) a transition metal compound;
(F) an oxygen-containing compound (i) represented by the following formula (1) or (2):

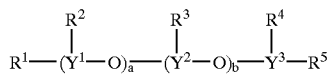
(1)

wherein, each of $R^1$ through $R^5$, which may be identical to or different from one another, represents a C1–C8 alkyl group; each of $Y^1$ through $Y^3$, which may be identical to or different from one another, represents a Group 13 element; and a and b independently represent numbers between 0 and 50 inclusive, with the proviso that a+b is equal to or greater than 1;

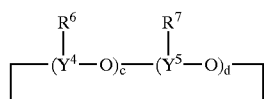
(2)

wherein, each of $R^6$ and $R^7$, which may be identical to or different from each other, represents a C1–C8 alkyl group; $Y^4$ and $Y^5$, which may be identical to or different from each other, represents a Group 13 element; and c and d independently represent numbers between 0 and 50 inclusive, with the proviso that c+d is equal to or greater than 1; and/or a compound (ii) capable of forming an ionic complex through reaction with transition metal compound (E):
(G) an alkylating agent.

(13) the method for producing an ethylene copolymer described in either one of the above-described (9) or (12)., wherein the transition metal compound (E) is represented by the following formula (3):

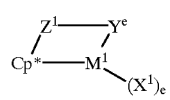
(3)

wherein $M^1$ represents titanium, zirconium, or hafnium; Cp* represents a cyclopentadienyl group or a substituted cyclopentadienyl group which is bonded to $M^1$ via a $\eta^5$ bonding mode, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, or a substituted octahydrofluorenyl group; $X^1$ represents a σ ligand; e represents 1 or 2; a plurality of $X^1$ may be identical to or different from one another and may be linked together via an arbitrary group; $Y^6$ represents O, S, NR, PR, $CR_2$, or a neutral two-electron donor selected from OR, SR, $NR_2$, or $PR_2$; $Z^1$ represents $SiR_2$, $CR_2$, $SiR_2SiR_2$, $CR_2CR_2$, CR=CR, $CRSiR_2$, $GeR_2$, BR, or $BR_2$; R represents hydrogen, an alkyl group, an aryl group, a silyl group, a haloalkyl group, a haloaryl group, or a combination of at least two of the above groups selected so as to have 20 or fewer non-hydrogen atoms; and two or more of the above R may further form a condensed ring system with $Z^1$ or with $Y^6$ and $Z^1$.

(14) the method for producing an aromatic vinyl graft copolymer recited in either one of the above-described (9) or (13), wherein aromatic vinyl monomer (H) is graft-copolymerized with ethylene copolymer macromer (I) through use of a catalyst formed of the following components (E) and (F):
(E) a transition metal compound; and
(F) an oxygen-containing compound (i) represented by the following formula (1) or (2):

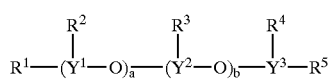
(1)

wherein, each of $R^1$ through $R^5$, which may be identical to or different from one another, represents a C1–C8 alkyl group; each of $Y^1$ through $Y^3$, which may be identical to or different from one another, represents a Group 13 element; and a and b independently represent numbers between 0 and 50 inclusive, with the proviso that a+b is equal to or greater than 1;

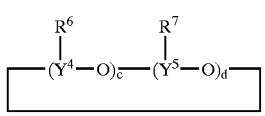

(2)

wherein, each of $R^6$ and $R^7$, which may be identical to or different from each other, represents a C1–C8 alkyl group;: $Y^4$ and $Y^5$, which may be identical to or different from each other, represents a Group 13 element; and c and d independently represent numbers between 0 and 50 inclusive, with the proviso that c+d is equal to or greater than 1: and/or a compound (ii) capable of forming an ionic complex through reaction with transition metal compound (E).

(15) the method for producing an aromatic vinyl graft copolymer described in the above-described (14), wherein the transition metal compound (E) is represented by the following formula (16) or (17):

$$M^{10}R^{26}{}_uR^{27}{}_vR^{28}{}_wR^{29}{}_{4-(u+v+w)} \tag{16}$$

$$M^{11}R^{30}{}_xR^{31}{}_yR^{32}{}_{3-(x+y)} \tag{17}$$

wherein each of $M^{10}$ and $M^{11}$ represents a metal that belongs to Groups 3–6 or the lanthanum group; each of $R^{26}$ through $R^{32}$ represents an alkyl group, an alkoxy group, an aryl group, an alkylaryl group, an arylalkyl group, an aryloxy group, an acyloxy group, a cyclopentadienyl group, an alkylthio group, an arylthio group, a substituted cyclopentadienyl group, an indenyl group, a substituted indenyl group, fluorenyl group, an amino group, an amide group, an acyloxy group, a phosphide group, a halogen atom, or a chelating agent; $R^{26}$ through $R^{29}$, or $R^{30}$ through $R^{32}$ may be identical to or different from each other and two of $R^{26}$ through $R^{29}$ or $R^{30}$ through $R^{32}$ may be cross-linked by use of $CH_2$ or $Si(CH_3)_2$ to form a complex; each of u, v, and w is an integer between 0 and 4 inclusive; each of x and y is an integer of 0 and 3 inclusive.

(16) The method for producing an aromatic vinyl graft copolymer described in the above-described (14), wherein the transition metal compound (E) is represented by the following formula (18):

$$TiR^{33}X^{14}Y^{10}Z^2 \tag{18}$$

wherein $R^{33}$ represents a cyclopentadienyl group, a substituted cyclopentadienyl group, an indenyl group, a substituted indenyl group, or a fluorenyl group, and each of $X^{14}$, $Y^{10}$, and $Z^2$ represents a hydrogen atom, a C1°C20 alkyl group, a C1–C20 alkoxy group, a C6–C20 aryl group, alkylaryl group, arylalkyl group, C6–C20 aryloxy group, C1–C20 acyloxy group, C1–C50 amino group, amide group, phosphide group, alkyl thio group, arylthio group, or a halogen atom: compounds in which one of $X^{14}$, $Y^{10}$, and $Z^2$ and $R^{33}$ are cross-linked with $CH_2$, $SiR_2$, etc.

(16) the method for producing an aromatic vinyl graft copolymer described in the above-described (14), wherein the transition metal compound (E) is represented by the following formula (19):

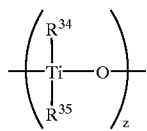

(19)

wherein each of $R^{34}$ and $R^{35}$ represents a halogen atom, C1–C20 alkoxy group, or an acyloxy group; and z is a number between 2 and 20 inclusive.

(18) the method for producing an aromatic vinyl graft copolymer described in the above-described (14), wherein the transition metal compound (E) is represented by the following formula (20):

$$M^{12}R^{36}R^{37}R^{38}R^{39} \tag{20}$$

wherein $M^{12}$ represents titanium, zirconium, or hafnium; each of $R^{36}$ and $R^{37}$, which may be identical to or different from each other, represents a cyclopentadienyl group, a substituted cyclopentadienyl group, an indenyl group, or a fluorenyl group; and each of $R^{38}$ and $R^{39}$, which may be identical to or different from each other, represents a hydrogen atom, a halogen atom, a C1–C20 hydrocarbon group, a C1–C20 alkoxy group, an amino group, or a C1–C20 thioalkoxy groups wherein $R^{38}$ and $R^{39}$ may be cross-linked by the mediation of a C1–C5 hydrocarbon group, a C1–C20 alkylsilyl group having 1–5 silicon atoms, or a C1–C20 germanium-containing hydrocarbon group having 1–5 germanium atoms.

(19) the method for producing an aromatic vinyl graft copolymer according to claim 20, wherein the transition metal compound (E) is represented by the following formula (3):

(3)

wherein $M^1$ represents titanium, zirconium, or hafnium; Cp* represents a cyclopentadienyl group or a substituted cyclopentadienyl group which is bonded to $M^1$ via a $\eta^5$ bonding mode, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, or a substituted octahydrofluorenyl group; $X^1$ represents a σ ligand; e represents 1 or 2; a plurality of $X^1$ may be identical to or different from one another and may be linked together via an arbitrary group; $Y^6$ represents O, S, NR, PR, $CR_2$, or a neutral two-electron donor selected from OR, SR, $NR_2$, or $PR_2$; $Z^1$ represents $SiR_2$, $CR_2$, $SiR_2SiR_2$, $CR_2CR_2$, CR=CR, $CRSiR_2$, $GeR_2$, BR, or $BR_2$; R represents hydrogen, an alkyl group, an aryl group, a silyl group, a haloalkyl group, a haloaryl group, or a combination of at least two of the above groups selected so as to have 20 or fewer non-hydrogen atoms; and two or more of the above R may further form a condensed ring system with $Z^1$ or with $Y^6$ and $Z^1$.

(20) the method for producing an aromatic vinyl graft copolymer described in either one of the above-described

(14) to (19), wherein the catalyst further contains an alkylating agent (G).

DESCRIPTION OF THE PREFERRED EMBODIMENTS

Embodiments of the present invention will next be described.

1. Ethylene Copolymer

The ethylene copolymer according to the present invention is a copolymer comprising an aromatic vinyl monomer (A), ethylene (B), a diene monomer (C), and an optional α-olefin (D) and having in the molecular chain of the copolymer a vinyl group attributed to a diene monomer.

(1) Aromatic vinyl monomer (A)

The aromatic vinyl monomers of formula (A) are compounds represented by the following formula (4):

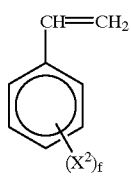

(4)

wherein $X^2$ represents a member which falls within the following cases 1)–3): 1) a hydrogen atom, 2) a halogen atom, 3) a substituent which contains at least one species selected from among a carbon atom, a tin atom, or a silicon atom; f represents an integer between 1 and 5 inclusive, wherein when $f \geq 2$, $X^2$ may be identical to or different from one another. Specifically, mention may be given of styrene; alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, and p-tert-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene; alkoxystyrenes such as methoxystyrene, ethoxystyrene, and t-butoxystyrene; vinylbiphenyls; vinylphenylnaphthalenes; vinylphenylanthracenes; halovinylbiphenyls; trialkylsilylvinylbiphenyls; halogen-substituted alkylstyrenes; alkylsilylstyrenes; phenyl-group-containing silylstyrenes; halosilylstyrenes; and silyl-group-containing silylstyrenes. Mixtures of two or more of these members are also usable. In addition, vinylnaphthalenes, vinylanthracenes, and their substituents may also be used.

(2) Ethylene (B)

No particular limitation is imposed, and a hydrogen may be substituted by a halogen, etc.

(3) Diene Monomer (C)

As used herein, the diene monomer (C) is a monomer having two or more C=C double bonds in the molecule. Mention may be given of C4–C20 conjugated diene compounds such as butadiene, isoprene, chloroprene, 1,3-hexadiene, 1,3-heptadiene; cyclodiene compounds such as cyclopentadiene, 2,5-norbornadiene, 1,3-cyclohexadiene, 1,4-cyclohexadiene, 1,3-cyclooctadiene, and 1,5-cyclooctadiene; and cycloolefins such as vinylnorbornene. Preferably, vinylstyrene compounds having styrene vinyl groups, such as those represented by the following formula (5) and (6), are used.

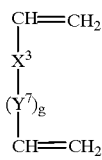

(5)

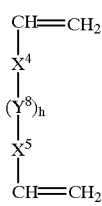

(6)

wherein each of $X^3$ through $X^5$ represents an aromatic compound residue such as benzene, naphthalene, or anthracene; an aromatic compound residue substituted by a C1–C20 alkyl group, such as toluene, xylene, or ethyl benzene; or a halogen-substituted aromatic compound residue such as chlorobenzene or bromobenzene; $X^4$ and $x^5$ may be identical to or different from one another; each of $Y^7$ and $Y^8$ represents $CH^2$, an alkylene group, or an alkyledene group; each of g and h represents an-integer between 0 and 20 inclusive.

Specific examples of the compounds represented by formula (5) include o-divinylbenzene, m-divinylbenzene, p-divinylbenzene, (o-, m-, p-)divinyltoluene, .(o-, m-, p-)2-propenylstyrene, (o-, m-, p-)3-butenylstyrene, and (o-, m-, p-)4-pentenylstyrene. Examples of the compounds represented by formula (6) include the compounds described below.

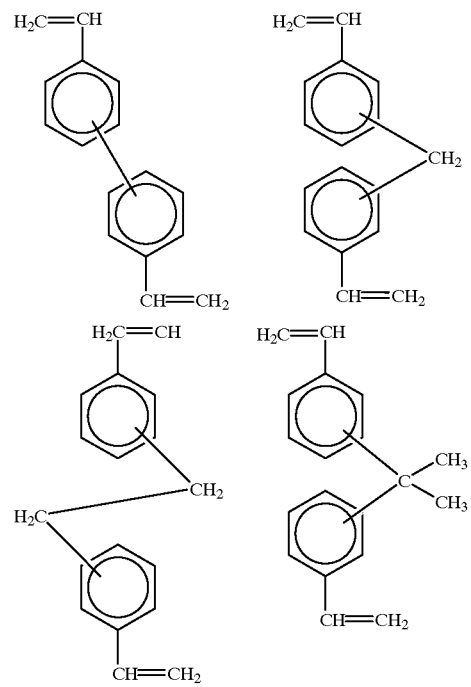

-continued

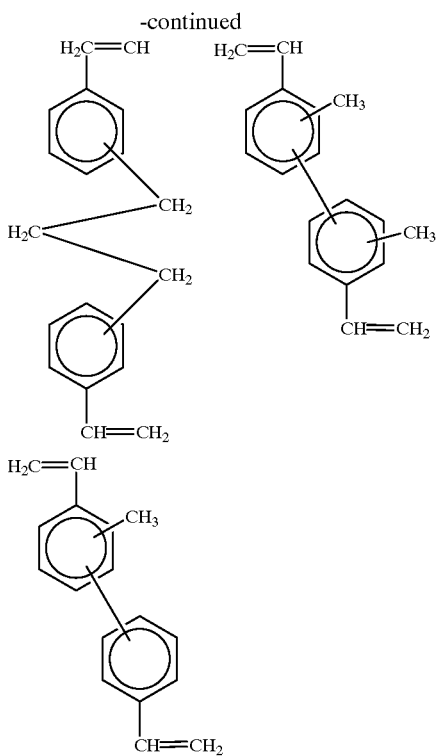

(4) α-Olefins (D)

α-Olefins (D) which are usable in the present invention are those other than ethylene. Specific examples include α-olefins such as propylene, butene-1, pentene-1, hexene-1, heptene-1, octene-1, nonene-1, decene-1,4-phenylbutene-1, 6-phenylhexene-1,3-methylbutene-1,4-methylpentene-1,3-methylpentene-1,3-methylhexene-1,4-methylhexene-1,5-methylhexene-1,3,3-dimethylpentene-1,3,4-dimethylpentene-1,4,4-dimethylpentene-1, and vinylcyclohexane; halogen-substituted α-olefins such as hexafluoropropene, tetrafluoroethylene, 2-fluoropropene, fluoroethylene, 1,1-difluoroethylene, 3-fluoropropene, trifluoroethylene, and 3,4-dichlorobutene-1; and cycloolefins such as cyclopentene, cyclohexene, norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene; and 5-benzylnorbornene. One, two or more of the above-listed compounds may be used in the present invention.

(5) The Ethylene Copolymers (b) are Obtained through Copolymerization of the Above-listed Monomers.

In the ethylene copolymers, recurrent units derived from aromatic vinyl monomer (A) are contained in an amount. of 1–98 mol %, preferably 3–50 mol %, more preferably 5–35 mol %; recurrent units derived from ethylene (B) are contained in an amount of 1–98 mol %, more preferably 50–97 mol %, and more preferably 65–95 mol %; and recurrent units derived from diene monomer (C) are contained in an amount of 0.001–10 mol %, preferably 0.01–5 mol %, more preferably 0.0.5–3 mol %. In the case in which α-olefins (D) are optionally: used as monomers, recurrent units derived from α-olefin (D) are in amounts of 0–90 mol % (exclusive of 0), preferably 0–50 mol % (exclusive of 0), more preferably 0–30 mol % (exclusive of 0). If the amount of the recurrent units attributed to aromatic vinyl monomer (A) is in excess of 98 mol %, brittleness of the copolymer itself of the present invention increases, whereas the corresponding amount is less than 1 mol %, compatibility with aromatic vinyl resins may deteriorate, leading to poor grafting ability upon use as a macromonomer. If the amount of the recurrent units attributed to ethylene (B) is less than 1 mol %, brittleness of the copolymer itself increases, whereas the corresponding amount is in excess of 98 mol %, crystallinity is excessively high, and solubility upon graft copolymerization may decrease. If the amount of the recurrent units attributed to diene monomer (C) is less than 0.001 mol %, grafting ability upon use as a macromonomer is insufficient, whereas the corresponding amount is in excess of 10 mol %, crosslinking reaction may occur. In addition, if the amount of the recurrent units attributed to α-olefin (D) is in excess of 90 mol %, crystallinity is excessively high, and solubility upon graft copolymerization may decrease.

The limiting viscosity [η] of the ethylene copolymers. (b) is 0.01–15 dl/g, preferably 0.1–12 dl/g, more preferably 0.5–10 dl/g, as measured in decalin at 135° C. In the case in which the limiting viscosity is less than 0.01 dl/g, poor compatibility results when graft copolymerization is carried out, whereas in the case in which the limiting viscosity is in excess of 15 dl/g, solubility upon graft polymerization may become poor. The molecular weight distribution of the ethylene copolymers as measured by GPC (gel permeation chromatography) is 8 or less, preferably 6 or less, more preferably 4 or less. If the molecular weight distribution is in excess of 8, graft copolymerization may not be carried out efficiently, and in addition, physicochemical properties of the resultant graft copolymers may become lowered.

2. Methods for Producing Ethylene Copolymers

Methods for producing the ethylene copolymers of the present invention are not particularly limited. For example, in order to produce the ethylene copolymers (b), it is preferable to use a catalyst system formed of a combination of vanadium halide or titanium halide such as vanadium tetrachloride, vanadium oxytrichloride or titanium tetrachloride, or vanadium compounds such as tri (acetylacetonate)vanadium, tri(2-methyl-1,3-butanedionato) vanadium, or tri(1,3-butanedionato)vanadium; and organic aluminum compounds such as trialkylaluminum or dialkylaluminum monohalide.

Alternatively and preferably, the ethylene copolymers may be prepared through copolymerization by use of a catalyst formed of the following (E), (F), and (G) (E): a transition metal compound, (F): an oxygen-containing compound (i) and/or a compound capable of forming an ionic complex through reaction with transition metal compound (E) (ii), and (G): an optional alkylation agent.

(1) Respective Components of the Catalyst (a) Transition metal compounds (E):

Various transition metal compounds may be used as the transition metal compound (E). Usually, it is preferable to use the compounds shown below.

(i) Compounds of formula (3):

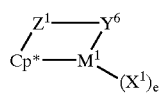

(3)

wherein $M^1$ represents titanium, zirconium, or hafnium; Cp* represents a cyclopentadienyl group or a substituted cyclopentadienyl group which is bonded to $M^1$ via a $\eta^5$ bonding mode, an indenyl group, a substituted indenyl group, a fluorenyl group, a substituted fluorenyl group, a hexahydroazulenyl group, a substituted hexahydroazulenyl group, a tetrahydroihdenyl group, a substituted tetrahydroindenyl group, a tetrahydrofluorenyl group, a substituted tetrahydrofluorenyl group, an octahydrofluorenyl group, or a substituted octahydrofluorenyl group; $X^1$ represents a σ ligand; e represents 1 or 2; a plurality of $X^1$ may be identical to or different from one another and may be linked together via an arbitrary group; $Y^6$ represents O, S, NR, PR, $CR_2$, or a neutral two-electron donor selected from OR, SR, $NR_2$, or $PR_2$; $Z^1$ represents $SiR_2 CR_2$, $SiR_2SiR_2$, $CR_2CR_2$, CR=CR, $CRSiR_2$, $GeR_2$, BR, or $BR_2$; R represents hydrogen, an alkyl group, an aryl group, a silyl group, a haloalkyl group, a haloaryl group, or a combination of at least two of the above groups selected so as to have 20 or fewer non-hydrogen atoms; and two or more of the above R may further form a condensed ring system with $Z^1$ or with $Y^6$ and $Z^1$.

In the present description, examples of the substituted cyclopentadienyl group include cyclopentadienyl groups substituted with one or more C1–C6 alkyl groups such as a methylcyclopentadienyl group, a 1,2-dimethylcyclopentadienyl group, a 1,2,4-trimethylcyclopentadienyl group, a 1,2,3,4-tetramethylcyclopentadienyl group, a trimethylsilylcyclopentadienyl group, a 1,3-di(trimethylsilyl)cyclopentadienyl group, a tertiary butylcyclopentadienyl group, a 1,3-di(tertiary butyl) cyclopentadienyl group, a C1–C20 hydrocarbyl group, or a C1–C20 halohydrocarbyl group. Examples of the substituted indenyl group include a methylindenyl group, a dimethylindenyl group, a tetramethylindenyl group, and a hexamethylindenyl group. Examples of the substituted tetrahydroindenyl group include a 4,5,6,7-tetrahydroindenyl group, a 1-methyl-4,5,6,7-tetrahydroindenyl group, a 2-methyl-4,5,6, 7-tetrahydroindenyl group, a 1,2-diethyl-4,5,6,7- tetrahydroin denyl group, a 1,3-dimethyl-4,5,6,7-tetrahydroindenyl group, a 1,2,3-trimethyl-4,5,6,7-tetrahydroindenyl group, a 1,2,3,4,5,6,7-heptamethyl-4,5,6, 7-tetrahydroindenyl group, a 1,2,4,5,66,7-hexamethyl-4,5,6,7-tetrahydroindenyl group, a 1,3,4,5,6,7-hexamethyl-4,5,6,7-tetrahydroindenyl group, and a 4,5,6,7-tetrahydro-1,2,3-trimethylindenyl group. Examples of the substituted fluorenyl group include a methylfluorenyl group, a dimethylfluorenyl group, a tetramethylfluorenyl group, and an octamethylfluorenyl group. Examples of the substituted tetrahydrofluorenyl group include a 1,2,3,4-tetrahydrofluorenyl group and a 9-methyl-1,2,3,4-tetrahydrofluorenyl group, and examples of the substituted octahydrofluorenyl group include a 9-methyl-octahydrofluorenyl group. Examples of the substituted hexahydroazulenyl group include a 1-methylhexahydroazulenyl group, a 2-methylhexahydroazulenyl group, a 1,2-dimethylhexahydroazulenyl group, a 1,3-dimethylhexahydroazulenyl group, and a 1,2,3-trimethylhexahydroazulenyl group.

$X^1$ represents a σ ligand, and examples include hydrido, halogen, alkyl, silyl, aryl, arylsilyl, amido, aryloxy, alkoxy, silyloxy, phosphido, sulfido, acyl, cyanido, azido, acetylacetonato, and a combination thereof.

Specific examples of compounds having the above ligands include (t-butylamido) (tetramethylcyclopentadienyl)-1,2-ethanediylzirconium dichloride, (t-butylamido)(tetramethylcyclopentadienyl)-1,2-ethanediyltitanium dichloride, (methylamido) (tetramethylcyclopentadienyl)-1,2-ethanediylzirconium dichloride, (methylamido)-(tetramethylcyclopentadienyl)-1,2-ethanediyltitanium dichloride, (ethylamido) (tetramethylcyclopentadienyl)-methylenetitaniim dichloride, (t-butylamido)dimethyl-(tetramethylcyclopentadienyl)silanetitanium dichloride, (t-butylamido)dimethyl(tetramethylcyclopentadienyl)-silanezirconium dichloride, (t-butylamido)dimethyl-(tetramethyl-cyclopentadienyl)silanetitanium dimethyl, (t-butylamido)dimethyl(tetramethylcyclopentadienyl) silanezircon ium dimethyl, (t-butylamido)dimethyl-(tetramethylcyclopentadienyl)-silanetitanium dibenzyl, (t-butylamido)dimethyl-(tetramethylcyclopentadienyl)-silanezirconium dibenzyl, (benzylamido)dimethyl-(tetramethylcyclopentadienyl)silanetitanium dichloride, (phenylphosphido)dimethyl-(tetramethylcyclopentadienyl)-silanezirconium dibenzyl, (t-butylamido)dimethyl-(tetramethylcyclopentadienyl)silanetitanium chloride, (dimethylaminoethyl)tetramethylcyclopentadienyl-titanium (III) dichloride, 9-(dimethylaminoethyl)octahydro-fluorenyltitanium(III) dichloride, (di-n-butylaminoethyl) tetramethyl-cyclopentadienyltitanium(III) dichloride, (dimethylaminomethyl)tetramethyl-cyclopentadienyltitanium(III) dichloride, and (dimethylaminopropyl)tetramethylcyclopentadienyl-titanium(III) dichloride.

(ii) Compounds represented by the following formula (7):

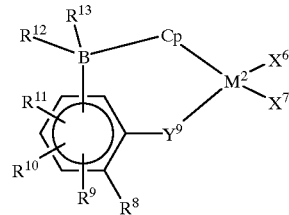

(7)

wherein $M^2$ represents a transition metal of Group 4 in the periodic table; Cp represents a cyclopentadienyl skeleton, $Y^9$ represents O, S, NR, PR, $CR_2$, or a neutral two-electron donor selected from OR, SR, $NR_2$, and $PR_2$; B represents an atom of Group 14 in the periodic table; R represents hydrogen, an alkyl group, an aryl group, a silyl group, a haloalkyl group, a haloaryl group, or a combination of at least two of the above groups selected so as to have 20 or fewer non-hydrogen atoms; each of $X^6$ and $X^7$, which may be identical to or different from each other, represents a hydrogen atom, a halogen atom, a C1–C20 hydrocarbyl group, a C1–C20 halohydrocarbyl group, a C1–C20 alkoxy group, a C6–C20 aryloxy group, or a C2–C20 di-substituted amino group; and: each of $R^8$ through $R^{13}$, which may be identical to or different from one another and may be arbitrarily linked to form a ring, represents a hydrogen atom, a halogen atom, a C1–C20 hydrocarbyl group, a C1–C20 halohydrocarbyl group, a C1–C20 alkoxy group, a C6–C20 aryloxy group, a C2–C20 di-substituted amino group, or a C1–C20 silyl group.

The groups having a cyclopentadienyl skeleton in the above Cp represent a group such as a cyclopentadienyl group, a substituted cyclopentadienyl group, an indenyl group, a substituted indenyl group,.a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, a octahydrofluorenyl group, or a substituted octahydrofluorenyl group. Examples of B include a carbon atom, a silicon atom, and a germanium atom, with a carbon atom and a silicon atom being preferred.

Specific examples of the compounds represented by formula (7) include isopropylidene(cyclopentadienyl)(3-t-butyl-5-methyl-2-phenoxy)titanium dichloride, isopropylidene(methylcyclopentadienyl)(3-t-butyl-5-methyl-2-phenoxy)titanium dichloride, isopropylidene(dimethylcyclopentadienyl)(3-t-butyl-5-methyl-2-phenoxy)titanium dichloride, isopropylidene(trimethylcyclopentadienyl)(3-t-butyl-5-methyl-2-phenoxy)titanium dichloride, isopropylidene(tetramethylcyclopentadienyl)(3-t-butyl-5-methyl-2-phenoxy)titanium dichloride, isopropylidene(n-propylcyclopentadienyl)(3-t-butyl-5-methyl-2-phenoxy)titanium dichloride, isopropylidene(primary butylcyclopentadienyl)(3-t-butyl-5-methyl-2-phenoxy)titanium dichloride, isopropylidene(phenylcyclopentadienyl)(3-t-butyl-5-methyl-2-phenoxy)titanium dichloride, isopropylidene(cyclopentadienyl)(3-t-butyl-2-phenoxy)titanium dichloride, isopropylidene(methylcyclopentadienyl)(3-t-butyl-2-phenoxy)titanium dichloride, isopropylidene(dimethylcyclopentadienyl)(3-t-butyl-2-phenoxy)titanium dichloride, isopropylidene(trimethylcyclopentadienyl)(3-t-butyl-2-phenoxy)titanium dichloride, isopropylidene(tetramethylcyclopentadienyl)(3-t-butyl-2-phenoxy)titanium dichloride, isopropylidene(n-propylcyclopentadienyl)(3-t-butyl-2-phenoxy)titanium dichloride, isopropylidene(primary butylcyclopentadienyl)(3-t-butyl-2-phenoxy)titanium dichloride, isopropylidene(phenylcyclopentadienyl)(3-t-butyl-2-phenoxy)titanium dichloride, isopropylidene(cyclopentadienyl)(2-phenoxy)titanium dichloride, isopropylidene(methylcyclopentadienyl)(2-phenoxy)titanium dichloride, isopropylidene(dimethylcyclopentadienyl)(2-phenoxy)titanium dichloride, isopropylidene(trimethylcyclopentadienyl)(2-phenoxy)titanium dichloride, isopropylidene(tetramethylcyclopentadienyl)(2-phenoxy)titanium dichloride isopropylidene(n-propylcyclopentadienyl)(2-phenoxy)titanium dichloride, isopropylidene(primary butylcyclopentadienyl)(2-phenoxy)titanium dichloride, and isopropylidene(phenylcyclopentadienyl)(2-phenoxy)titanium dichloride. Examples also include the above compounds in which titanium is substituted with zirconium or hafnium and in which isopropylidene is substituted with dimethylsilylene, diphenylsilylene, or methylene. Examples further include the above compounds in which dichloride is substituted with dibromide, diiodide, dimethyl, dibenzyl, dimethoxide, or diethoxide.

(iii) Compounds represented by the following formula (8) or (9):

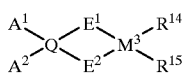

(8)

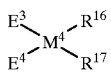

(9)

wherein each of $E^1$ through $E^4$ represents a substituted or unsubstituted cyclopentadienyl group, an indenyl group, or a fluorenyl group, a substituted fluorenyl group; each of $A^1$ and $A^2$ represents a hydrogen atom, a C1–C10 alkyl group, a C6–C20 aryl group, a C6–C20 alkylaryl group, a C6–C20 arylalkyl group, a C6–C20 haloaryl group, or a C1–C20 hydrocarbon group containing a hetero atom which is selected from among oxygen, nitrogen, sulfur, and silicon; Q, which connects $E^1$ and $E^2$, represents a C2–C10 hydrocarbon group, a C1–C10 hydrocarbon group containing silicon, germanium, or tin, a carbon atom, a silicon atom, a germanium atom, or a tin atom; $A^1$ and $A^2$ may be linked to each other to form a ring together with Q; each of $R^{14}$ through $R^{14}$ represents a halogen atom, a hydrogen atom, a C1–C10 alkyl group, a silicon-containing alkyl group, a C6–C20 aryl group, a C6–C20 alkylaryl group, or a C6–C20 arylalkyl group; each of $M^3$ and $M^4$ represents titanium, zirconium, or hafnium.

Specific examples of $E^1$ through $E^4$ mentioned above include a cyclopentadienyl group, a methylcyclopentadienyl group, a dimethylcyclopentadienyl group, a tetramethylcyclopentadienyl group, an indenyl group, a 3-methylindenyl group, a tetrahydroindenyl group, a fluorenyl group, a methylfluorenyl group, and a 2,7-di-t-butylfluorenyl group.

Specific examples of $A^1$ and $A^2$ include a hydrogen atom, a methyl group, an ethyl group, a propyl group, a phenyl group, a toluyl group, a fluorophenyl group, a methoxyphenyl group, and a benzyl group.

In the case in which $A^1$ and $A^2$ are linked to each other and form a ring structure together with Q, specific examples of groups which may be formed by $A^1$, $A^2{}_1$ and Q include a cyclopentylidene group, a cyclohexylidene group, and a tetrahydropyran-4-ylidene group.

Preferable examples of $R^{14}$ through $R^{17}$ include a chlorine atom, a methyl group, a phenyl group, and a trimethylsilyl-methyl group.

Specific examples of the above-mentioned transition metal compounds include ethylenebis(1-indenyl)zirconium dichloride, ethylenebis(tetrahydro-1-indenyl)zirconium dichloride, isopropylidene(cyclopentadienyl)-(fluorenyl)zirconium dichloride, methylphenylmethylene-(cyclopentadienyl)(fluorenyl)zirconium dichloride, and diphenylmethylene(cyclopentadienyl)(fluorenyl)zirconium dichloride.

(iv) Transition metal compounds having a single π ligand $R^{16}$ represented by the following formula (10):

$M^5 R^{18} X^8{}_i$     (10)

wherein $M^5$ represents a transition metal of Group 4 in the periodic table or a lanthanide metal; $R^{18}$ represents a π ligand, e.g., a group having a cyclopentadienyl skeleton; $X^8$ represents a hydrogen atom, a halogen atom, a, C1–C20 hydrocarbyl group, a C1–C20 alkoxy group, a C1–C20 thioalkoxy group, a C6–C20 aryl group, a C6–C20 aryloxy group, a C6–C20 thioaryloxy group, an amino group, or an alkylsilyl group; a plurality of $X^8$ may be identical to or different from one another and may be linked to $R^{18}$ via a specific group; and i represents the valence of $M^5$.

Examples of the compounds represented by formula (9) include mono(cyclopentadienyl)transition metal compounds, mono(indenyl)transition metal compounds, and mono(fluorenyl)transition metal compounds. Examples of the substituted cyclopentadienyl group include cyclopentadienyl groups substituted with one or more C1–C6 alkyl groups such as a methylcyclopentadienyl group, a 1,3-dimethylcyclopentadienyl group, a 1,2,4-trimethylcyclopentadienyl group, a 1,2,3,4-tetramethylcyclopentadienyl group, a trimethylsilylcyclopentadienyl group, a 1,3-di(trimethylsilyl)cyclopentadienyl group, a tertiary butylcyclopentadienyl group, a 1,3-di(tertiary butyl)cyclopentadienyl group, and a pentamethylcyclopentadienyl group. Titanium is preferably used as a transition metal. Examples of the titanium compounds include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1,2,4-trimethylcyclopentadienyltrimethyltitanium, 1,2,3,4-tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentainethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitaniu triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, pentamethylcyclopentadienyltitanium trithiomethoxide, pentamethylcyclopentadienyltitanium trithiophenoxide.

(b) Oxygen-containing compounds (i) and/or compounds capable of forming an ionic complex through reaction with a transition metal compound (ii) (F):

The component (F) which serves as the polymerization catalyst in the present invention contains the below-described oxygen-containing compounds (i) and/or compounds capable of forming an ionic complex through reaction with a transition metal compound (ii).

(i) Oxygen-containing compounds

The oxygen-containing compounds comprise a compound represented by the below-described formula (1):

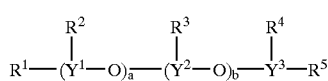

(1)

and/or a compound represented by the below-described formula (2):

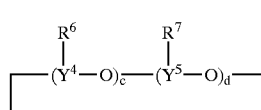

(2)

wherein, each of $R^1$ through $R^7$, which may be identical to or different from one another, represents a C1–C8 alkyl group, specifically, a methyl group, an ethyl group, an n-propyl group, an isopropyl group, a butyl group, a pentyl group, a hexyl group, a heptyl group, or an octyl group. $R^1$ to $R^5$ may be identical to or different from one another. Each of $R^6$ and $R^7$, which may be identical to or different from each other. Each of $Y^1$ through $Y^5$ represents a Group 13 element, specifically, B, Al, Ga, In, and Tl, with B and Al being preferred. $Y^1$ through $Y^5$ may be identical to or different from one another, wherein $Y^4$ and $Y^5$ may be identical to or different from each other. Each of a through d is a number between 0 and 50 inclusive, and each of (a+b) and (c+d) is a number of 1 or more. The preferable range for each of a through d is 1–20 inclusive, with 1–5 inclusive being particularly preferred.

Preferable examples of the oxygen-containing compounds used as the above-mentioned catalyst component, particularly examples of alkylaluminoxanes, include compounds having a proportion of the high-magnetic field component in a methyl proton signal region of 50% or less based on an aluminum-methyl (Al—CH$_3$) bond measured through a $^1$H-NMR spectrum. Briefly, when the above oxygen-containing compound is subjected to measurement of its $^1$H-NMR spectrum in a solvent toluene at room temperature, a methyl proton signal based on Al—CH$_3$ is observed in the range between 1.0 and −0.5 ppm with tetramethylsilane (TMS) as a standard. Since the proton signal of TMS (0 ppm) exists in the region for observing a methyl proton based on Al—CH$_3$, a methyl proton signal is measured with a methyl proton signal ranging from toluene of 2.35 ppm to the TMS standard as a standard. The signal is formed of a high-magnetic field component (i.e., from 0.1 to −0.5 ppm) and the other component (i.e., from 1.0 to −0.1 ppm). The compounds which may preferably be used have a high-magnetic field component of 50% or less, preferably 45–5%.

(ii) Compounds capable of forming an ionic complex through reaction with a transition metal compound Examples of the compound capable of forming an ionic complex through reaction with a transition metal compound include Lewis acids and coordination compounds comprising a cation and an anion containing a metal to which a plurality of groups are bonded. There exist a variety of coordination compounds which comprise a cation and an anion containing a metal to which a plurality of groups are bonded, and compounds represented by the below-described formulas (11) and (13) may preferably be used:

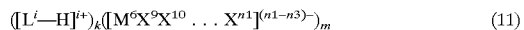

(11)

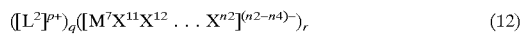

(12)

wherein $L^1$ represents a Lewis base, each of $M^6$ and $M^7$ represents a metal selected from Group 5 to Group 15 elements; $L^2$ represents the below-mentioned $M^8$, $R^{19}R^{20}M^9$, or $R^{21}{}_5C$, wherein $M^8$ represents a metal of Group 1 or a metal selected from Group 8 to Group 12 elements; $M^9$ represents a metal selected from Group 8 to Group 10 elements; each of $R^{19}$ and $R^{20}$ represents a cyclopentadienyl group, a substituted cyclopentadienyl group, an indenyl group, or a fluorenyl group; $R^{21}$ represents an alkyl group; each of $X^9$, $X^{10}$ through $X^{n1}$ and $X^{11}$, $X^{12}$ through $X^{n2}$ represents a hydrogen atom, a dialkylamino group, an alkoxy group, an aryloxy group, a C1–C20 alkyl group, a C6–C20 aryl group, an alkylaryl group, an arylalkyl group, a substituted alkyl group, an organic metalloid group, or a halogen atom; n3 represents a valence of $M^6$ and n4 represents a valence of $M^7$, and is an integer between 1–7 inclusive; each of n1 and n2 is an integer between 2 and 8 inclusive; j represents an ion valence of $L^1$-H and p represents an ion valence of $L^2$, and each of j and p is an integer between 1–7 inclusive; each of k and q is an integer of one or more; m=k×j/(n1−n3); and r=q×p/(n2−n4).

Examples of $M^6$ and $M^7$ include atoms such as B, Al, Si, P, As, or Sb; examples of $M^8$ include atoms such as Ag, Cu, Na, or Li; and examples of $M^9$ include atoms such as Fe, Co, or Ni. Examples of $X^9$, $X^{10}$ through $X^{n1}$ and $X^{11}$, $X^{12}$ through $X^{n2}$ include dialkylamino groups such as a dimethylamino group or a diethylamino group; alkoxy groups such as a methoxy group, an ethoxy group, or an n-butoxy group; aryloxy groups such as a phenoxy group, a 2,6-dimethylphenoxy group, or a naphthyloxy group; C1–C20 alkyl groups such as a methyl group, an ethyl group, an n-propyl group, an isopropyl group, an n-butyl group, an n-octyl group, or a 2-ethylhexyl group; C6–C20 aryl groups, alkylaryl groups, or arylalkyl groups such as a phenyl group, a p-tolyl group, a benzyl group, a pentafluorophenyl group, a 3,5-ditrifluoromethyl)phenyl group, a 4-tert-butylphenyl group, a 2,6-dimethylphenyl group, a 3,5-dimethylphenyl group, a 2,4-dimethylphenyl group, or a 1,2-dimethylphenyl group; halogens such as F, Cl, Br, or I; organic metalloid groups such as a pentamethylantimonyl; a trimethylsilyl, a trimethylgermyl group, a diphenylarsenyl, a dicyclohexylantimonyl, or a diphenylboron group. Examples of the (substituted) cyclopentadienyl group represented by $R^{19}$ and $R^{20}$, respectively, include a methylcyclopentadienyl group, a butylcyclopentadienyl group, and a pentamethylcyclopentadienyl group.

Specific examples of the anion containing a metal to which a plurality of groups are bonded include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6H_5)_4^-$, $B(C_6CF_3F_4)_4^-$, $B(C_6C_2H_5F_4)_4^-$, $PF_6^-$, $P(C_6F_5)_6^-$, and $Al(C_6HF_4)_4^-$, Examples of the metal-containing cation include $Cp_2Fe^+$, $(MeCp)_2Fe^+$, $(t\text{-}BuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$ and examples of the other cations include nitrogen-containing compounds such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, or N,N-diethylanilinium; carbenium compounds such as triphenylcarbenium, tri(4-methylphenyl)carbenium, or tri(4-methoxyphenyl)carbenium; alkylphosphonium ions such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(CH_{2H5})_3PH^+$, $(C_3H_7)_3PH^+$, $(CF_3)_3PH^+$, $(CH_3)_4P^+$, $(C_2H_5)_4P^+$, or $(C_3H_7)_4P^+$; and arylphosphonium ions such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$, or $(C_2H_5)_2(C_6H_5)_2P^+$.

Specifically, among the compounds represented by formulas (11) and (12), the following compounds are preferably used. Examples of the compound represented by formula (11) include triethylammonium tetraphenylborate, tri(n-butyl)ammonium tetraphenylborate, trimethylammnonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl) borate, pyrrolinium tetrakis(pentafluorophenyl)borate, N,N-dimethylanilinium tetrakis(pentafluorophenyl)borate, and methyldiphenylammonium tetrakis(pentafluorophenyl) borate. Examples of the compound represented by formula (14) include ferrocenium tetraphenylborate, dimethylferrocenium tetrakis(pentafluorophenyl)borate, ferrocenium tetrakis (pentafluorophenyl) borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate, and silver tetrafluoroborate.

Examples of the Lewis acids which may be used include $B(C_6F_5)_3$, $B(C_6HF_4)_3$, $B(C_6H_2F_3)_3$, $B(C_6H_3F_2)_3$, $B(C_6H_4F)_3$, $B(C_6CF_3F_4)_3$, $PF_5$, and $Al(C_6HF_4)_3$. In the polymerization catalysts used in the present invention as the component (F), oxygen-containing compounds may exclusively be used singly or in combination of two or more species serving as the component (i) or compounds being able to form an ionic complex through reaction with a transition metal compound may exclusively be used singly or in combination of two or more species serving as the component (ii). Alternatively, the component (i) and the component (ii) may appropriately used in combination.

(c) Alkylating agents (G):

There are a variety of alkylating agents, and examples thereof include alkyl group-containing aluminum compounds represented by formula (13):

$$R^{22}{}_s Al(OR^{23})_t X^{13}{}_{3-s-t} \tag{13}$$

wherein each of $R^{22}$ and $R^{23}$ represents a C1–C8, preferably a C1–C4, alkyl group; $X^{13}$ represents a hydrogen atom or a halogen atom; s is defined as $0<s\leq 3$, and is preferably 2 or 3, most preferably 3; t is defined as $0 \leq t<3$, and is preferably 0 or 1; alkyl group-containing magnesium compounds represented by formula (14):

$$R^{24}{}_2 Mg \tag{14}$$

wherein $R^{24}$ represents a C1–C8, preferably a C1–C4, alkyl group; and alkyl group-containing zinc compounds represented by formula (15):

$$R^{25}{}_2 Zn \tag{15}$$

wherein $R^{25}$ represents a C1–C8, preferably a C1–C4, alkyl group.

Among these alkyl group-containing compounds, alkyl group-containing aluminum compounds, inter alia, trialkylaluminum compounds and dialkylaluminum compounds, are preferred.

(2) Methods for Preparing the Catalysts

Examples of methods for contacting components (E) and (F) of the catalysts for polymerization with an optional component (G) include (1) adding the component (G) to a mixture of the component (E) and the component (F) to thereby provide a catalyst, and contacting monomers to be polymerized with the catalyst; (2) adding the component (E) to a mixture of the component (F) and the component (G) to thereby provide a catalyst, and contacting monomers to be polymerized with the catalyst; (3) adding the component (F) to a mixture of the component (E) and the component (G) to thereby provide a catalyst, and contacting monomers to be polymerized with the catalyst; (4) individually contacting the components (E), (F), and (G) with monomer components to be polymerized; and (5) contacting a mixture of a monomer component to be polymerized and the component (G) with the catalysts prepared in the above (1) through (3).

The above component (E) and component (F) are contacted with the optional component (G) at the polymerization temperature or in the temperature range from −20 to 200° C.

Organic aluminum compounds such as truisobutylaluminum may be added prior to feeding catalyst components so as to scavenge impurities.

(3) Polymerization Methods

Bulk polymerization may be employed as the polymerization method, and polymerization may be conducted in aliphatic hydrocarbon solvents such as pentane, hexane, or heptane; alicyclic hydrocarbon solvents such as cyclohexane; and aromatic hydrocarbon solvents such as benzene, toluene, xylene, or ethylbenzene. No particular limitation is imposed on the polymerization temperature, and it is typically 0–200° C., preferably 20–100° C.

In the obtained aromatic vinyl graft copolymers, the compositional ratio of polymer segment derived from aromatic vinyl monomer (H) and that derived from ethylene copolymer macromer (I) can be regulated through feed amounts of the monomers (I).

3. Aromatic Vinyl Graft Copolymers

The aromatic vinyl graft copolymers of the present invention are graft copolymerization products between an aromatic vinyl monomer (H) and the above-described ethylene copolymer (hereinafter may be referred to as ethylene copolymer macromer) (I). The ethylene copolymer macromer (I) is obtained through copolymerization of aromatic vinyl monomer (A), ethylene (B), and diene monomer (C), wherein the amount of the recurrent units attributed to aromatic vinyl monomer (A) is 1–98 mol %, the amount of the recurrent units attributed to ethylene (B) is 1–98 mol %, and the amount of the recurrent units attributed to diene monomer (C) is 0.001–10 mol %. The molecular chain of the aromatic vinyl graft copolymer is an ethylene copolymer having a vinyl group attributed to a diene monomer. The chains derived from aromatic vinyl monomers in the polymer products have stereospecificity of highly syndiotactic structure.

(1) Aromatic Vinyl Monomers (H)

Specific description of the aromatic vinyl monomers (H) is omitted, since the aromatic vinyl monomers (H) which are usable in the present invention are identical to those which are used as copolymerization components in the preparation of the aforementioned ethylene copolymers.

(2) Ethylene Copolymer Macromers (I)

The ethylene copolymer macromers (I) of the present invention are obtained through copolymerization of aromatic vinyl monomer (A), ethylene (B), diene monomer (C), and an optional α-olefin (D), and are identical to those listed for the aforementioned ethylene copolymers. Therefore, detailed description thereof is omitted.

The aromatic vinyl graft copolymers of the present invention are obtained through copolymerization of the aforementioned aromatic vinyl monomer (A) and the aforementioned ethylene copolymer macromer (I). The aromatic vinyl graft copolymers are preferably constituted by 97–50 wt %, more preferably 95–50 wt %, most preferably 90–60 wt %, of the polymer segment attributed to aromatic vinyl monomer (H), and 3–50 wt %, more preferably 5–50 wt %, most preferably 10–40 wt %, of a polymer segment attributed to the ethylene copolymer (I). The polymer segment attributed to ethylene copolymer (I) encompasses components both grafted and not grafted. In the case in which the polymer segment attributed to ethylene copolymer (I) is present in an amount of less than 3 wt %, satisfactory effect for improving toughness may not be obtained, whereas the corresponding amount is in excess of 50 wt %, the melt viscosity of the graft copolymer will increase, and thus molding may become difficult or the elastic modulus may decrease, to thereby cause deformation during mold release following molding. The graft ratio ("weight of grafted components among the segments of ethylene copolymer (I) "/" weight of polymer segments attributed to ethylene copolymer (I) containing both grafted components and non-grafted components") is prferably 10 wt % or more, more preferably 20 wt % or more. If the ratio is less than 10 wt %, sufficient effect for improving toughness of the graft copolymer may not be obtained.

The limiting viscosity [η] of the aromatic vinyl graft copolymer of the present invention is 0.05–10 dl/g, preferably 0.1–8 dl/g, more preferably 1–5 dl/g, as measured in decalin at 135° C. If the limiting viscosity is less than 0.05 dl/g, satisfactory compatibility-enhancing effect may not be exhibited, and thus toughness may not be satisfactorily improved. On the other hand, if the limiting viscosity is in excess of 10 dl/g, the viscosity when the copolymer is melted extremely increases, to thereby hamper polymerization of the aromatic vinyl monomer to result in a reduced graft efficiency.

In the aromatic vinyl graft copolymers of the present invention, the chain attributed to an aromatic vinyl monomer has a stereospecificity of highly syndiotactic structure;. i.e., in the case of racemic dead, a syndiotacticity of 75% or more, preferably not less than 85%, and in the case of racemic pentad, a syndiotacticity of 30% or more, preferably not less than 50%. When a mixture of two or more monomers is used as a styrene monomer, the segment derived from the styrene monomer may be a random or block copolymerization product of the monomers.

4. Method for Preparing Aromatic Vinyl Graft Copolymers

No particular limitation is imposed on the method for preparing the aromatic vinyl graft copolymers. For example, they may be obtained by adding a powdery ethylene copolymer macromer (I) to a syndiotactic aromatic vinyl polymer powder which has already been synthesized and heating to initiate reaction. Preferably, the ethylene copolymer macromer (I) may be obtained by dissolving in an aromatic vinyl monomer (H) or in a solvent containing the monomer (H), then copolymerizing by use oft (E) a transition metal compound, (H) (i) an oxygen-containing compound and/or (ii) a compound that can form an ionic complex through reaction with a transition metal compound (E), and (G) an optional alkylating agent. In this case, there is preferably used a method in which the ethylene copolymer macromer (I) is dissolved in an aromatic vinyl monomer (H) or a solvent containing the same (H), in view of conducting homogeneous reaction. No particular limitation is imposed on the solvent, and hydrocarbon solvents such as toluene, benzene, or ethylbenzene are preferably used. Next will be described catalysts preferably used for copolymerization.

(1) Components of Catalyst:

(a) Transition metal compounds (J)

A variety of transition metals may be used as (a) transition metal compound (J), and there may be used the aforementioned transition metal compounds serving as the component of the polymerization catalyst for the above-described ethylene copolymer macromer (I). Moreover, compounds represented by formula (16) or formula (17) may be used.

$$M^{10}R^{26}{}_{u}R^{27}{}_{v}R^{28}{}_{w}R^{29}{}_{4-(u+v+w)} \tag{16}$$

$$M^{11}R^{30}{}_{x}R^{31}{}_{y}R^{32}{}_{3-(x+y)} \tag{17}$$

wherein each of $M^{10}$ and $M^{11}$ represents a metal that belongs to Groups 3–6 or the lanthanum group; each of $R^{26}$ through $R^{32}$ represents an alkyl group, an alkoxy group, an aryl group, an alkylaryl group, an arylalkyl group, an aryloxy group, an acyloxy group, a cyclopentadienyl group, an alkylthio group, an arylthio group, a substituted cyclopentadienyl group, an indenyl group, a substituted indenyl group, fluorenyl group, an amino group, an amide group, an acyloxy group, a phosphide group, a halogen atom, or a chelating agent; each of u, v, and w is an integer between 0 and 4 inclusive; each of x and y is an integer of 0 and 3 inclusive; and two of $R^{26}$ through $R^{29}$ or two of $R^{30}$ through $R^{32}$ may be cross-linked by use of $CH_2$ or $Si(CH_3)_2$ to form a complex.

Preferably, each of the metal $M^{10}$ and $M^{11}$ that belongs to Groups 3–6 or the lanthanum group is a metal that belongs to group 4, inter alia, titanium, zirconium, and hafnium. Preferable titanium compounds are represented by the following formula (18):

$$TiR^{33}X^{14}Y^{10}Z^2 \qquad (18)$$

wherein $R^{33}$ represents a cyclopentadienyl group, a substituted cyclopentadienyl group, an indenyl group a substituted indenyl group, or a fluorenyl group, and each of $X^{14}$, $Y^{10}$, and $Z^2$ represents a hydrogen atom, a C1–C20 alkyl group, a C1–C20 alkoxy group, a C6–C20 aryl group, alkylaryl group, arylalkyl group, C6–C20 aryloxy group, C1–C20 acyloxy group, C1–C50 amino group, amide group, phosphide group, alkyl thio group, arylthio group, or a halogen atom. Compounds in which one of $X^{14}$, $Y^{10}$ and $Z^2_1$ and $R^{33}$ are cross-linked with $CH_2$, $SiR_2$, etc. also fall within the definition of the formula (18) compounds.

Of these titanium compounds, those having no halogen atom are preferred. Particularly, titanium compounds having a single π-electron system ligand as described above are preferred.

Also, as titanium compounds, there may be used condensation titanium compounds represented by the following formula (19):

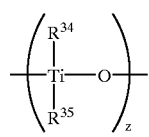

(19)

wherein each of $R^{34}$ and $R^{35}$ represents a halogen atom, C1–C20 alkoxy group, or an acyloxy group; and z is a number between 2 and 20 inclusive. These titanium compounds may be transformed into complexes by use of esters or ether before use.

Examples of other transition metal compounds which serve as component (a) include those having two conjugate-π-electron-containing ligands, and specifically, mention may be given of at least one compound selected from among the transition metal compounds represented by the following formula (20):

$$M^{12}R^{36}R^{37}R^{38}R^{39} \qquad (20)$$

wherein $M^{12}$ represents titanium, zirconium, or hafnium; each of $R^{36}$ and $R^{37}$ represents a cyclopentadienyl group, a substituted cyclopentadienyl group, an indenyl group, or a fluorenyl group; and each of $R^{38}$ and $R^{39}$ represents a hydrogen atom, a halogen atom, a C1–C20 hydrocarbon group, a C1–C20 alkoxy group, an amino group, or a C1–C20 thioalkoxy group, wherein $R^{36}$ and $R^{37}$ may be cross-linked by the mediation of a C1–C5 hydrocarbon group, a C1–C20 alkylsilyl group having 1–5 silicon atoms, or a C1–C20 germanium-containing hydrocarbon group having 1–5 germanium atoms.

(b) (i) oxygen-containing compounds and/or (ii) compounds capable of forming an ionic complex through reaction with a transition metal compound (F):

Compounds described in relation to the synthesis of ethylene copolymer macromers may be used.

(c) Alkylating agents (G):

Those described in relation to the synthesis of ethylene copolymer macromers may be used.

(2) Preparation of Catalysts:

Examples of methods for contacting components (J) and (F) of the catalysts for polymerization with optional component (G) include the-following methods (1) through (5). According to method (1), component (G) is added to a mixture of component (J) and component (F) to thereby provide a catalyst. The catalyst is contacted with monomers to be polymerized (i.e., in the present invention, a solution obtained by dissolving macromer (I) in aromatic vinyl monomer (H) or in a solvent containing aromatic vinyl monomer (H)). According to method (2), component (E) is added to a mixture of component (F) and component (G) to thereby provide a catalyst, and the catalyst is contacted with monomers to be polymerized. According to method (3), component (F) is added to a mixture of component (J) and component (G) to thereby provide a catalyst, and the catalyst is contacted with monomers to be polymerized. According to method (4), respective components (J), (F), and (G) are individually contacted with monomer components to be polymerized. According to method (5), a mixture of a monomer component to be polymerized and component (G) with a catalyst prepared by any of the methods (1) through (3).

The above component (J) and component (Fb) may be contacted with the optional component (G) at the polymerization temperature or in the temperature range of −20 to 200° C.

The catalysts used in polymerization are thus formed of a combination of the aforementioned components (J) and (F), or of a combination of the aforementioned components (a), (F), and (G). Other catalyst components may also be incorporated in the catalyst system. The proportions of respective catalysts may vary in accordance with conditions and thus are not univocally determined. Usually, if the component (F) is an oxygen-containing compound, the mole ratio of component (J) to component (F) is preferably from 1:1 to 1:10,000, more preferably from 1:1 to 1:1,000; if the component (F) is a compound which is capable of forming an ionic complex through reaction with a transition metal compound, the mole ratio of component (J) to component (F) is preferably from 0.1:1 to 1:0.1; and if component (G) is used, the mole ratio of component (J) to component (G) is preferably from 1:0.1 to 1:1,000.

Prior to feeding catalyst components, organic aluminum compounds such as triisobutylaluminum may be added so as to scavenge impurities.

(3) Polymerization Methods:

Bulk polymerization may be employed as the polymerization method, and polymerization may be conducted in aliphatic hydrocarbon solvents such as pentane, hexane, or heptane; alicyclic hydrocarbon solvents such as cyclohexane; and aromatic hydrocarbon solvents such as benzene, toluene, xylene, or ethylbenzene. No particular limitation is imposed on the polymerization temperature, and it is typically 0–200° C., preferably 20–100° C.

The proportions of the polymer segment derived from aromatic vinyl monomer (H) and that derived from ethylene copolymer macromer (I) in the final aromatic vinyl graft copolymer may be suitably regulated in accordance with the amounts of aromatic vinyl monomer (H) and macromer (I) which undergo polymerization.

EXAMPLES

The present invention will next be described in more detail by way of example.

Example 1

In a 2-liter pressure-proof polymerization tank were placed dehydrated toluene (260 ml), active-alumina-treated purified styrene (600 ml), active-alumina-treated p-divinylbenzene (4.5 ml)(manufactured by Nippon Steel Chemical Co., Ltd., high-purity para isomer T-30), and methylaluminoxane (manufactured by Albemarle) such that an aluminum concentration was 9 mmol. Ethylene was fully melted under a constant pressure of 0.6 MPa, and (t-butylamido)dimethyl ($\eta^5$-1,2,3,4-tetrahydro-9-fluorenyl) silanetitanium dichloride was added thereto such that an titanium concentration was 15 $\mu$mol. Subsequently, ethylene was subjected to polymerization at 70° C. for 30 minutes under a constant ethylene pressure.

After removal of ethylene gas, polymerization was terminated by addition of a small amount of methanol.

The obtained viscous solution was precipitated in methanol, and a polymer was recovered. The polymer was dried at 50° C. under reduced pressure, to thereby obtain an methylene copolymer (83.8 g).

The composition was confirmed by $^1$H-NMR to be ethylene/styrene/divinylbenzene=78.4/21.5/0.1 (mol %). The amount of divinylbenzene was calculated from the NMR peak corresponding to the vinyl groups. Styrenic vinyl groups were confirmed to exist in the molecular chain.

No cross-linked product in a gel form was produced. The obtained ethylene copolymer had a [$\eta$] of 1.3 and a molecular weight distribution (Mw/Mn) of 1.87 as measured by GPC.

Example 2

The procedure of Example 1 was repeated except that the amount of dehydrated toluene was 500 ml, the amount of active-alumina-treated purified styrene was 930 ml, the amount of active-alumina-treated p-divinylbenzene (manufactured by Nippon Steel Chemical Co., Ltd., high-purity para isomer T-30) was 10.5 ml, the amount of methylaluminoxane (manufactured by Albemarle) was such that an aluminum concentration was 18 mmol, triisobutyla-luminoxane (manufactured by Tosoh-Akzo Co., Ltd.) was further added thereto such that an aluminum concentration was 0.5 mmol, the amount of (t-butylamido) dimethyl ($\eta^5$-1,2,3,4-tetrahydro-9-fluorenyl)silanetitanium dichloride was such that an titanium concentration was 30 n mol, and polymerization temperature was 90° C.

An ethylene copolymer was obtained in an amount of 115.3 g.

The composition was confirmed by $^1$H-NMR to be ethylene/styrare/divinylbenzene=71.1/29.6/0.4 (mol %). The amount of divinylbenzene was calculated from the NMR peak corresponding to the vinyl groups. Styrenic vinyl groups were confirmed to exist in the molecular chain.

No cross-linked product in a gel form was obtained. The obtained ethylene copolymer had a [$\eta$] of 1.4 and a molecular weight distribution (Mw/Mn) of 1.89 as measured by GPC.

Example 3

The procedure of Example 1 was repeated except that the capacity of the pressure-proof container was 1 liter; no toluene was used; active-alumina-treated purified styrene (200 ml), active-alumina-treated p-divinylbenzene (1.5 ml) (manufactured by Nippon Steel Chemical Co., Ltd., high-purity para isomer T-30), and methylaluminoxane (manufactured by Albemarle) (in the concentration as reduced to the aluminum concentration of 5.0 mmol) were added; a mixture gas of ethylene and propylene (8:2 by mol ratio) was then continuously added thereto until ethylene and propylene were fully dissolved and the pressure in the container reached a steady state at 0.6 MPa; and (t-butylamido) dimethyl ($\eta^5$-1,2,3,4-tetrahydro-9-fluorenyl) silanetitanium dichloride was added thereto such that a titanium concentration was 5 $\mu$mol, to thereby obtain an ethylene-propylene copolymer (15.2 g).

The composition was confirmed by $^1$H-NM to be ethylene/propylene/styrene/divinylbenzene=68.5/12.2/19.1/0.3 (mol %). The amount of divinylbenzene was calculated from the NMR peak corresponding to the vinyl groups. Styrenic vinyl groups were confirmed to exist in the molecular chain.

No cross-linked product in a gel form was produced. The obtained ethylene copolymer had a [$\eta$] of 1.2 and a molecular weight distribution (Mw/Mn) of 1.51 as measured by GPC.

Example 4

(1) Synthesis of Ethylene Copolymer Macromer

In a 2-liter pressure-proof polymerization tank were placed dehydrated toluene (500 ml), active-alumina-treated purified styrene (1000 ml), active-alumina-treated divinylbenzene (5.0 ml)(manufactured by Nippon-Steel Chemical Co., Ltd., high-purity para and meta isomer T-30, divinylbenzene content: 70 wt. %), and methylaluminoxane (manufactured by Albemarle) such that an aluminum concentration was 18 mmol. Ethylene was fully melted under a constant pressure of 0.8 MPa, and (t-butylamido)dimethyl (tetramet-$\eta^5$-cyclopentadienyl)silanetitan un dichloride was added thereto such that a titanium concentration was 30 $\mu$mol. Subsequently, ethylene was Subjected to polymerization at 70 ° C. for 90 minutes under a constant ethylene pressure. After removal of ethylene gas, polymerization was terminated by addition of a small amount of methanol.

The resultant viscous solution was precipitated in methanol, and a polymer was recovered. The polymer was dried at 50° C. under reduced pressure, to thereby obtain an ethylene copolymer (115 g).

The composition was confirmed by $^1$H-NMR to be ethylene/styrene/divinylbenzene=71.3/28.5/0.2 (mol %). The limiting viscosity [$\eta$] was 1.4.

(2) Synthesis of Aromatic Viryl Graft Copolymer

In a 500-ml separable flask were placed fully-dehydrated toluene (156 ml) and active-alumina-treated purified styrene (100 ml). After purge with nitrogen, the ethylene copolymer macromer (6.0 g) synthesized in procedure (1) above was added to the mixture under stirring. The macromer was completely dissolved in the styrene monomer liquid at 50° C.

Next, the solution of ethylene copolymer macromer in styrene was heated to 75° C., and triisobutyl aluminum (1.0 mmol) was added thereto. Subsequently, a titanium-mixed catalyst prepared in advance was added thereto such that a titanium concentration was 5.0 $\mu$mol, and the mixture was subjected to polymerization for 10 minutes under stirring. The mixture ratio of the titanium-mixed catalyst was methylaluminoxane:triisobutyl aluminum:titanium=75:25:1 (mol ratio), and the titanium was in the form of 1,2,3,4,5,6,7,8-octahydrofluorenyltitanium trimethoxide.

Polymerization was terminated by addition of a small amount of methanol. The polymer was washed with methanol and dried at 50° C. under reduced pressure for 12 hours, to thereby obtain a polymer (yield: 17.1 g).

The thus-obtained aromatic vinyl graft copolymer had a total ethylene copolymer macromer content of 35 wt. %. The ethylene copolymer macromer had a limiting viscosity [η] of 1.4 dl/g. The graft ratio was 37.1 wt. %, and the tensile elongation was 95%.

Example 5

The procedure of Example 4 was repeated except that, in step (2), the amount of toluene was 400 ml, the amount of ethylene copolymer macromer was 12.0 g, the amount of titanium-mixed catalyst was such that a titanium concentration was 15.0 μmol, to thereby obtain. a polymer (yield: 44.4 g).

The thus-obtained aromatic vinyl graft copolymer had a total ethylene copolymer macromer content of 27 wt. %. The ethylene copolymer macromer had a limiting viscosity [η] of 1.4 dl/g. The graft ratio was 62.8 wt. %, and the tensile elongation was 94%.

Example 6

(1) Synthesis of Ethylene Copolymer Macromer

In a 2-liter pressure-proof polymerization tank were placed dehydrated toluene (500 ml), active-alumina-treated purified styrene (1000 ml), active-alumina-treated divinylbenzene (5.0 ml) (manufactured by Nippon Steel Chemical Co., Ltd., high-purity para and meta isomer T-30, divinylbenzene content: 70 wt. %), and methylaluminoxane (manufactured by Albemarle) Euch that an aluminum concentration was 25 mmol. Subsequently, a mixture gas of ethylene and propylene (8:2 by mol ratio) was continuously added thereto until ethylene and propylene were fully dissolved and the pressure in the container reached a steady state at 0.6 Mpa, and (t-butylamido)dimethyl(tetramethyl-η$^5$-cyclopentadienyl)silanetitanium dichloride was then added thereto such that a titanium concentration was 30 μmol, followed by polymerization at 70° C. for 90 minutes under a constant ethylene pressure. After removal of ethylene gas, polymerization was terminated by addition of a small amount of methanol.

The thus-obtained viscous solution was precipitated in methanol, and a polymer was recovered. The polymer was dried at 50° C. under reduced pressure, to thereby obtain an ethylene copolymer (108 g).

The composition was confirmed by $^1$H-NMR to be ethylene/propylene/styrene/divinylbenzene=57.8/13.8/28.2/0.2 (mol %). The limiting viscosity [η] was 1.2.

(2) Synthesis of Aromatic Vinyl Graft Copolymer

The procedure of Example 5 was repeated except that ethylene copolymer macromer obtained in step (1) above was used in an amount of 12 g. The yield of the polymer was 35.8 g.

The thus-obtained aromatic vinyl graft copolymer had a total ethylene copolymer macromer content of 34 wt. %. The ethylene copolymer macromer had a limiting viscosity [η] of 1.2 dl/g. The graft ratio was 61.5 wt. %, and the tensile elongation was 88%.

Comparative Example 1

(1) Synthesis of Ethylene Copolymer Macromer having no Vinyl Groups

The procedure of Example 4 was repeated except that p-divinylbenzene was not used in step (1), to thereby synthesize an ethylene copolymer macromer having no vinyl groups.

The. amount of the obtained ethylene copolymer was 125 g, and the composition was confirmed to be ethylene/styrene/divinylbenzene=73.6/26.4/0 (mol %). The limiting viscosity [η] was 1.5.

(2) Synthesis of Aromatic Vinyl Graft Copolymer

The procedure of Example 4 was repeated except that ethylene copolymer macromer obtained in the step (1) above was used instead. The yield of the polymer was 15.9 g.

The thus-obtained product had a total ethylene copolymer macromer content of 25 wt. %. The ethylene copolymer macromer had a limiting viscosity [η] of 1.5 dl/g. The graft ratio was 0 wt. %, and the tensile elongation was 6%.

Comparative Example 2

Polystyrene having a homo-type syndiotactic structure (Mw=200,000) and SEBS (G1651; manufactured by Shell Chemical Co., Ltd.) were mixed at a weight ratio of 80:20, and the mixture was pelletized at 300° C. by use of a biaxial extruder (30 mmø; manufactured by Ikegai Steelwork Co., Ltd.)

The thus-obtained product had an SEBS content of 20 wt. %. The graft ratio was 0 wt. %, and the tensile elongation was 13%.

The respective evaluation items for the above aromatic vinyl graft copolymer were measured as follows:

(1) Ethylene Copolymer Macromer Content (wt. %)

This is represented by % by weight of ethylene copolymer macromer contained in the aromatic vinyl graft copolymer, and obtained through the following equation: amount of incorporated ethylene copolymer macromer/amount of final polymer.

(2) Graft Ratio (wt. %)

This is represented by the following expression: "weight of grafted components among the segments of ethylene copolymer (I) "/" weight of copolymer segments attributed to ethylene copolymer (I) containing both grafted components and non-grafted components." Specifically, "weight of grafted components among the segments of ethylene copolymer (I)" represents the value of the total weight of ethylene copolymer macromer minus the weight of non-grafted ethylene copolymer macromer, and "weight of copolymer segments attributed to ethylene copolymer (I) containing both grafted components and non-grafted components" represents the total weight of the ethylene copolymer macromer obtained in step (1) above. The amount of non-grafted components is the weight of ethylene copolymer which is recovered from a methylene chloride phase obtained by subjecting a fine dry powder of the graft copolymer to a 6 hr Soxhlet extraction in methylene chloride.

(3) Tensile Elongation (%)

A pellet of aromatic vinyl graft copolymer was heated to 300° C. and shaped into a press sheet having a thickness of 100 μm, followed by annealing at 200° C. for 30 minutes so as to fully crystallize. Subsequently, dumbbell-shaped test pieces were punched out and subjected to a tensile elongation test.

The tensile elongation test was performed by use of a SHIMADZU AUTOGRAPH AG5000B. The dumbbell type was DIN-53504. The tensile rate was 1.0 mm/sec, and the initial length was 20 mm.

As described above, the ethylene copolymers obtained by the present invention are endowed with excellent heat resistance, chemical resistance, etc., as well as with remarkable toughness, elongation, and compatibility. Therefore, they are very useful in the following applications among others: macrornonomers for obtaining syndiotactic polystyrene graft copolymers which are advantageously used as a raw material for complex materials or heat-resistant elastomers; and compatibility-enhancing agents for a composition containing a syndiotactic polystyrene and a rubber component or a composition containing typical polystyrene and a rubber component.

What is claimed is:

1. An aromatic vinyl graft copolymer which is a graft copolymerization product of an aromatic vinyl monomer (H) and ethylene copolymer macromer (I) which has in the molecular chain a vinyl group attributed to a diene monomer having a styrenic vinyl group;

wherein the ethylene copolymer (I) is obtained by copolymerization of an aromatic vinyl monomer (A), ethylene (B) and a diene monomer having a styrenic vinyl group (C);

wherein a recurrent unit attributed to aromatic vinyl monomer (A) is 1–98 mol %, a recurrent unit attributed to ethylene (B) is 1–98 mol %, and a recurrent unit attributed to the diene monomer having the styrenic vinyl group (C) is 0.001–10 mol %.

2. An aromatic vinyl graft copolymer which is a graft copolymerization product of an aromatic vinyl monomer (H) and ethylene copolymer macromer (I) which has in the molecular chain a vinyl group attributed to a diene monomer having a styrenic vinyl group;

wherein the ethylene copolymer (I) is obtained by copolymerization of an aromatic vinyl monomer (A), ethylene (B), a diene monomer having a styrenic vinyl group (C) and α-olefin (D);

wherein a recurrent unit attributed to aromatic vinyl monomer (A) is 1–98 mol %, a recurrent unit attributed to ethylene (B) is 1–98 mol %, a recurrent unit attributed to the diene monomer having the styrenic vinyl group (C) is 0.001–10 mol % and a recurrent unit attributed to α-olefin (D) is 0–90 mol %, exclusive of 0.

3. An aromatic vinyl graft copolymer according to claim 1, wherein a chain attributed to aromatic vinyl monomer (A) has a stereospecificity of highly syndiotactic structure.

4. An aromatic vinyl graft copolymer according to claim 2, wherein a chain attributed to aromatic vinyl monomer (A) has a stereospecificity of highly syndiotactic structure.

5. An aromatic vinyl graft copolymer according to claim 1, wherein the ethylene copolymer macromer (I) is prepared by use of a catalyst formed of the following components (E) and (F):

(E) a transition metal compound;

(F) an oxygen-containing compound (i) represented by the following formula (1) or (2):

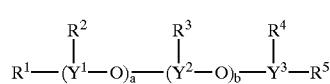
(1)

wherein, each of $R^1$ through $R^5$, which may be identical to or different from one another, represents a C1–C8 alkyl group; each of $Y^1$ through $Y^3$ which may be identical to or different from one another, represents a Group 13 element; and a and b independently represent numbers between 0 and 50 inclusive, with the proviso that a+b is equal to or greater than 1;

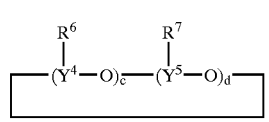
(2)

wherein, each of $R^6$ and $R^7$, which may be identical to or different from each other, represents a C1–C8 alkyl group; $Y^4$ and $Y^5$, which may be identical to or different from each other, represents a Group 13 element; and c and d independently represent numbers between 0 and 50 inclusive, with the proviso that c+d is equal to or greater than 1; and/or a compound (ii) capable of forming an ionic complex through reaction with transition metal compound (E).

6. An aromatic vinyl graft copolymer according to claim 1, wherein the ethylene copolymer macromer (I) is prepared by use of a catalyst formed of the following components (E), (F) and (G):

(E) a transition metal compound;

(F) an oxygen-containing compound (i) represented by the following formula (1) or (2):

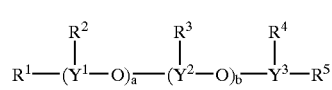
(1)

wherein, each of $R^1$ through $R^5$, which may be identical to or different from one another, represents a C1-C8 alkyl group; each of $Y^1$ through $Y^3$ which may be identical to or different from one another, represents a Group 13 element; and a and b independently represent numbers between 0 and 50 inclusive, with the proviso that a+b is equal to or greater than 1;

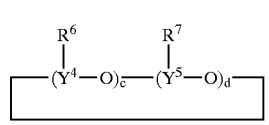
(2)

wherein, each of $R^6$ and $R^7$, which may be identical to or different from each other, represents a C1–C8 alkyl group; $Y^4$ and $Y^5$, which may be identical to or different from each other, represents a Group 13 element; and c and d independently represent numbers between 0 and 50 inclusive, with the proviso that c+d is equal to or greater than 1; and/or a compound (ii) capable of forming an ionic complex through reaction with transition metal compound (E); and (G) an alkylating agent.

7. The aromatic vinyl graft copolymer according to claim 5, wherein the transition metal compound (E) is represented by the following formula (3):

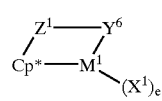
(3)

wherein $M^1$ represents titanium, zirconium, or hafnium; Cp* represents a cyclopentadienyl group or a substituted cyclopentadienyl group which is bonded to $M^1$ via a $\eta^5$ bonding mode, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, or a substituted octahydrofluorenyl group; $X^1$ represents σ ligand; e represents 1 or 2; a plurality of $X^1$ may be identical to or different from one another and may be linked together via an arbitrary group; $Y^6$ represents O, S, NR, PR, $CR_2$, or a neutral two-electron donor selected from OR, SR, $NR_2$, or $PR_2$; $Z^1$ represents $SiR_2$, $CR_2$, $SiR_2SiR_2$, $CR_2CR_2$, CR=CR, $CRSiR_2$, $GeR_2$, BR, or $BR_2$; R represents hydrogen, an alkyl group, an aryl group, a silyl group, a haloalkyl group, a haloaryl group, or a combination of at least two of the above groups selected so as to have 20 or fewer nonhydrogen atoms; and two or more of the above R may further form a condensed ring system with $Z^1$ or with $Y^6$ and $Z^1$.

8. The aromatic vinyl graft copolymer according to claim 6, wherein the transition metal compound (E) is represented by the following formula (3):

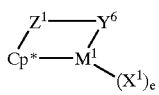

(3)

wherein $M^1$ represents titanium, zirconium, or hafnium; Cp* represents a cyclopentadienyl group or a substituted cyclopentadienyl group which is bonded to $M^1$ via a $\eta^5$ bonding mode, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, or a substituted octahydrofluorenyl group; $X^1$ represents σ ligand; e represents 1 or 2; a plurality of $X^1$ may be identical to or different from one another and may be linked together via an arbitrary group; $Y^6$ represents O, S, NR, PR, $CR_2$, or a neutral two-electron donor selected from OR, SR, $NR_2$, or $PR_2$; $Z^1$ represents $SiR_2$, $CR_2$, $SiR_2SiR_2$, $CR_2CR_2$, CR=CR, $CRSiR_2$, $GeR_2$, Br, or $BR_2$; R represents hydrogen, an alkyl group, an aryl group, a silyl group, a haloalkyl group, a haloaryl group, or a combination of at least two of the above groups selected so as to have 20 or fewer nonhydrogen atoms; and two or more of the above R may further form a condensed ring system with $Z^1$ or with $Y^6$ and $Z^1$.

9. The aromatic vinyl graft copolymer according to claim 1, wherein aromatic vinyl monomer (H) is graft-copolymerized with ethylene copolymer macromer (I) through use of a catalyst formed of the following components (E) and (F):
(E) a transition metal compound; and
(F) an oxygen-containing compound (i) represented by the following formula (1) or (2):

$$R^1-(Y^1-O)_a-(Y^2-O)_b-Y^3-R^5 \quad (1)$$

wherein, each of $R^1$ through $R^5$, which may be identical to or different from one another, represents a C1–C8 alkyl group; each of $Y^1$ through $Y^3$, which may be identical to or different from one another, represents a Group 13 element; and a and b independently represent numbers between 0 and 50 inclusive, with the proviso that a+b is equal to or greater than 1;

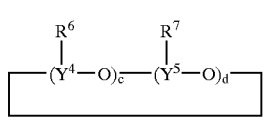

(2)

wherein, each of $R^6$ and $R^7$, which may be identical to or different from each other, represents a C1–C8 alkyl group; $Y^4$ and $Y^5$, which may be identical to or different from each other, represents a Group 13 element; and c and d independently represent numbers between 0 and 50 inclusive, with the proviso that c+d is equal to or greater than 1; and/or a compound (ii) capable of forming an ionic complex through reaction with transition metal compound (E).

10. The aromatic vinyl graft copolymer according to claim 9, wherein the transition metal compound (E) is represented by the following formula (16) or (17):

$$M^{10}R^{26}{}_uR^{27}{}_vR^{28}{}_wR^{29}{}_{4-(u+v+w)} \quad (16)$$

$$M^{11}R^{30}{}_xR^{31}{}_yR^{32}{}_{3-(x+y)} \quad (17)$$

wherein each of $M^{10}$ and $M^{11}$ represents a metal that belongs to Groups 3–6 or the lanthanum group; each of $R^{26}$ through $R^{32}$ represents an alkyl group, an alkoxy group, an aryl group, an alkylaryl group, an arylalkyl group, an aryloxy group, an acyloxy group, a cyclopentadienyl group, an alkylthio group, an arylthio group, a substituted cyclopentadienyl group, an indenyl group, a substituted indenyl group, fluorenyl group, an amino group, an amide group, an acyloxy group, a phosphide group, a halogen atom, or a chelating agent; $R^{26}$ through $R^{29}$, or $R^{30}$ through $R^{32}$ may be identical to or different from each other; each of u, v, and w is an integer between 0 and 4 inclusive; each of x and y is an integer of 0 and 3 inclusive; and two of $R^{26}$ through $R^{29}$ or $R^{30}$ through $R^{32}$ may be cross-linked by use of $CH_2$ or $Si(CH_3)_2$ to form a complex.

11. The aromatic vinyl graft copolymer according to claim 9, wherein the transition metal compound (E) is represented by the following formula (18):

$$TiR^{33}X^{14}Y^{10}Z^2 \quad (18)$$

wherein $R^{33}$ represents a cyclopentadienyl group, a substituted cyclopentadienyl group, an indenyl group, a substituted indenyl group, or a fluorenyl group, and each of $X^{14}$, $Y^{10}$, and $Z^2$ represents a hydrogen atom, a C1–C20 alkyl group, a C1–C20 alkoxy group, a C6–C20 aryl group, alkylaryl group, arylalkyl group, C6–C20 aryloxy group, C1–C20 acyloxy group, C1–C50 amino group, amide group, phosphide group, alkyl thio group, arylthio group, or a halogen atom; and wherein one of $X^{14}$, $Y^{10}$, and $Z^2$ and $R^{33}$ are optionally cross-linked with $CH_2$ or $SiR_2$.

12. The aromatic vinyl graft copolymer according to claim 9, wherein the transition metal compound (E) is represented by the following formula (19):

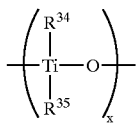

(19)

wherein each of $R^{34}$ and $R^{35}$ represents a halogen atom, C1–C20 alkoxy group, or an acyloxy group; and z is a number between 2 and 20 inclusive.

13. The aromatic vinyl graft copolymer according to claim 9, wherein the transition metal compound (E) is represented by the following formula (20):

$$M^{12}R^{36}R^{37}R^{38}R^{39} \quad (20)$$

wherein $M^{12}$ represents titanium, zirconium, or hafnium; each of $R^{36}$ and $R^{37}$, which may be identical to or different from each other, represents a cyclopentadienyl group, a substituted cyclopentadienyl group, an indenyl group, or a fluorenyl group; and each of $R^{38}$ and $R^{39}$, which may be identical to or different from each other, represents a hydrogen atom, a halogen atom, a C1–C20 hydrocarbon group, a C1–C20 alkoxy group, an amino group, or a C1–C20 thioalkoxy group, wherein $R^{38}$ and $R^{39}$ may be cross-linked by the mediation of a C1–C5 hydrocarbon group, a C1–C20 alkylsilyl group having 1–5 silicon atoms, or a C1–C20 germanium-containing hydrocarbon group having 1–5 germanium atoms.

14. The aromatic vinyl graft copolymer according to claim 9, wherein the transition metal compound (E) is represented by the following formula (3):

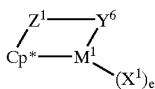

(3)

wherein $M^1$ represents titanium, zirconium, or hafnium; Cp* represents a cyclopentadienyl group or a substituted cyclopentadienyl group which is bonded to $M^1$ via a $\eta^5$ bonding mode, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, or a substituted octahydrofluorenyl group; $X^1$ represents σ ligand; e represents 1 or 2; a plurality of $X^1$ may be identical to or different from one another and may be linked together via an arbitrary group; $Y^6$ represents O, S, NR, PR, $CR_2$, or a neutral two-electron donor selected from OR, SR, $NR_2$, or $PR_2$; $Z^1$ represents $SiR_2$, $CR_2$, $SiR_2SiR_2$, $CR_2CR_2$, CR=CR, $CRSiR_2$, $GeR_2$, BR, or $BR_2$; R represents hydrogen, an alkyl group, an aryl group, a silyl group, a haloalkyl group, a haloaryl group, or a combination of at least two of the above groups selected so as to have 20 or fewer nonhydrogen atoms; and two or more of the above R may further form a condensed ring system with $Z^1$ or with $Y^6$ and $Z^1$.

15. The aromatic vinyl graft copolymer according to claim 9, wherein the catalyst further contains an alkylating agent (G).

16. A method for producing an ethylene copolymer, comprising:

copolymerizing an aromatic vinyl monomer (A), ethylene (B) and a diene monomer having a styrenic vinyl group (C) using a catalyst formed of the following components (E) and (F):

(E) a transition metal compound; and (F) an oxygen-containing compound (i) represented by formulae (1) or (2):

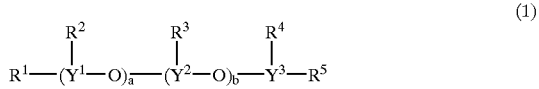

(1)

wherein each of $R^1$ through $R^5$, which may be identical to or different from one another, represents a C1–C, alkyl group; each of $Y^1$ through $Y^3$ which may be identical to or different from one another, represents a Group 13 element; and a and b independently represent numbers between 0 and 50 inclusive, with the proviso that a+b is equal to or greater than 1;

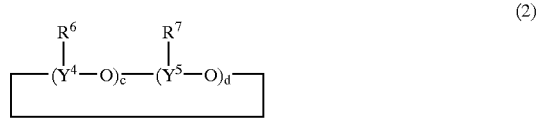

(2)

wherein, each of $R^6$ and $R^7$, which may be identical to or different from each other, represents a $C_1$–$C_8$ alkyl group; $Y^4$ and $Y^5$, which may be identical to or different from each other, represents a Group 13 element; and c and d independently represent numbers between 0 and 50 inclusive, with the proviso that c+d is equal to or greater than 1; and/or a compound (ii) capable of forming an ionic complex through reaction with transition metal compound (E);

wherein said ethylene copolymer has in the molecular chain a vinyl group attributed to said diene monomer having the styrenic vinyl group; and wherein a recurrent unit attributed to said aromatic vinyl monomer (A) is 1–98 mol %, a recurrent unit attributed to ethylene (B) is 1–98 mol % and a recurrent unit attributed to said diene monomer having the styrenic vinyl group (C) is 0.001–10 mol %.

17. A method for producing an ethylene copolymer, comprising:

copolymerizing an aromatic vinyl monomer (A), ethylene (B), a diene monomer having a styrenic vinyl group (C), and α-olefin (D) using a catalyst formed of the following components (E) and (F):

(E) a transition metal compound; and (F) an oxygen-containing compound (i) represented by formulae (1) or (2):

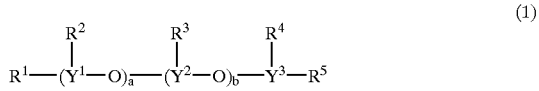

(1)

wherein, each of $R^1$ through $R^5$, which may be identical to or different from one another, represents a $C_1$–$C_8$ allyl group; each of $Y^1$ through $Y^3$ which may be identical to or different from one another, represents a Group 13 element; and a and b independently represent numbers between 0 and 50 inclusive, with the proviso that a+b is equal to or greater than 1;

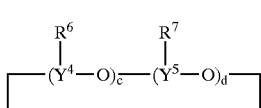
(2)

wherein, each of $R^6$ and $R^7$, which may be identical to or different from each other, represents a $C_1$–$C_8$ alkyl group; $Y^4$ and $Y^5$, which may be identical to or different from each other, represent a Group 13 element; and c and d independently represent numbers between 0 and 50 inclusive, with the proviso that c+d is equal to or greater than 1; and/or a compound (ii) capable of forming an ionic complex through reaction with transition metal compound (E);

wherein said ethylene copolymer has in the molecular chain a vinyl group attributed to said diene monomer having the styrenic vinyl group;

wherein a recurrent unit attributed to aromatic vinyl monomer (A) is 1–98 mol %, a recurrent unit attributed to ethylene (B) is 1–98 mol %, a recurrent unit attributed to the diene monomer having the styrenic vinyl group (C) is 0.001–10 mol % and a recurrent unit attributed to α-olefin (D) is 0–90 mol %, exclusive of 0 mol %.

18. A method for producing an ethylene copolymer, comprising:

copolymerizing an aromatic vinyl monomer (A), ethylene (B) and a diene monomer having a styrenic vinyl group (C) using a catalyst formed of the following components (E) and (F):

(E) a transition metal compound; and (F) an oxygen-containing compound represented by formula (1):

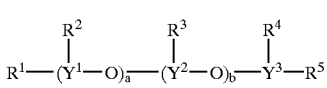
(1)

wherein, each of $R^1$ through $R^5$, which may be identical to or different from one another, represents a $C_1$–$C_8$ alkyl group; each of $Y^1$ through $Y^3$, which may be identical to or different from one another, represents a Group 13 element; and a and b independently represent numbers between 0 and 50 inclusive, with the proviso that a+b is equal to or greater than 1;

wherein said ethylene copolymer has in the molecular chain a vinyl group attributed to said diene monomer having the styrenic vinyl group;

wherein recurrent units attributed to said aromatic vinyl monomer (A) is 1–98 mol %, recurrent units attributed to ethylene (B) is 1–98 mol % and recurrent units attributed to said diene monomer having the styrenic vinyl group (C) is 0.001–10 mol %.

19. A method for producing an ethylene copolymer, comprising:

copolymerizing an aromatic vinyl monomer (A), ethylene (B) and a diene monomer having a styrenic vinyl group (C) using a catalyst formed of the following components (E) and (F):

(E) a transition metal compound; and (F) an oxygen-containing compound represented by formula (2):

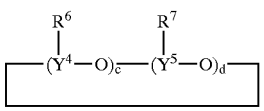
(2)

wherein, each of $R^6$ and $R^7$, which may be identical to or different from each other, represents a $C_1$–$C_8$ alkyl group; $Y^4$ and $Y^5$, which may be identical to or different from each other, represents a Group 13 element; and c and d independently represent numbers between 0 and 50 inclusive, with the proviso that c+d is equal to or greater than 1;

wherein said ethylene copolymer has in the molecular chain a vinyl group attributed to said diene monomer having the styrenic vinyl group;

wherein recurrent units attributed to said aromatic vinyl monomer (A) is 1–98 mol %, recurrent units attributed to ethylene (B) is 1–98 mol % and recurrent units attributed to said diene monomer having the styrenic vinyl group (C) is 0.001–10 mol %.

20. A method for producing an ethylene copolymer, comprising:

copolymerizing an aromatic vinyl monomer (A), ethylene (B) and a diene monomer having a styrenic vinyl group (C) using a catalyst formed of the following components (E) and (F):

(E) a transition metal compound; and (F) a compound capable of forming an ionic complex through reaction with transition metal compound (E);

wherein said ethylene copolymer has in the molecular chain a vinyl group attributed to said diene monomer having the styrenic vinyl group;

wherein recurrent units attributed to said aromatic vinyl monomer (A) is 1–98 mol %, recurrent units attributed to ethylene (B) is 1–98 mol % and recurrent units attributed to said diene monomer having the styrenic vinyl group (C) is 0.001–10 mol %.

21. A method for producing an ethylene copolymer, comprising:

copolymerizing an aromatic vinyl monomer (A), ethylene (B) and a diene monomer having a styrenic vinyl group (C) using a catalyst formed of the following components (E), (F) and (G):

(E) a transition metal compound;

(F) an oxygen-containing compound (i) represented by formulae (1) or (2):

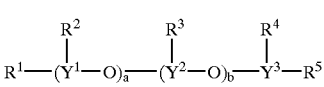
(1)

wherein, each of $R^1$ through $R^5$, which may be identical to or different from one another, represents a $C_1$–$C_8$ alkyl group; each of $Y^1$ through $Y^3$ which may be identical to or different from one another, represents a Group 13 element; and a and b independently represent numbers between 0 and 50 inclusive, with the proviso that a+b is equal to or greater than 1;

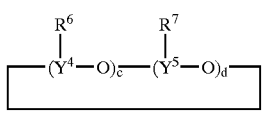

(2)

wherein, each of $R^6$ and $R^7$, which may be identical to or different from each other, represents a $C_1$–$C_8$ alkyl group; $Y^4$ and $Y^5$, which may be identical to or different from each other, represents a Group 13 element; and c and d independently represent numbers between 0 and 50 inclusive, with the proviso that c+d is equal to or greater than 1; and/or a compound (ii) capable of forming an ionic complex through reaction with transition metal compound (E); and (G) an alkylating agent;

wherein said ethylene copolymer has in the molecular chain a vinyl group attributed to said diene monomer having the styrenic vinyl group;

wherein recurrent units attributed to said aromatic vinyl monomer (A) is 1–98 mol %, recurrent units attributed to ethylene (B) is 1–98 mol % and recurrent units attributed to said diene monomer having the styrenic vinyl group (C) is 0.001–10 mol %.

22. A method for producing an ethylene copolymer, comprising:

copolymerizing an aromatic vinyl monomer (A), ethylene (B) and a diene monomer having a styrenic vinyl group (C) using a catalyst formed of the following components (E), (F) and (G):

(E) a transition metal compound;

(F) an oxygen-containing compound represented by formula (1):

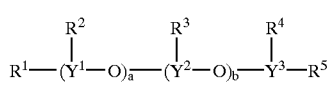

(1)

wherein, each of $R^1$ through $R^5$, which may be identical to or different from one another, represents a $C_1$–$C_8$ alkyl group; each of $Y^1$ through $Y^3$, which may be identical to or different from one another, represents a Group 13 element; and a and b independently represent numbers between 0 and 50 inclusive, with the proviso that a+b is equal to or greater than 1; and (G) an alkylating agent;

wherein said ethylene copolymer has in the molecular chain a vinyl group attributed to said diene monomer having the styrenic vinyl group;

wherein recurrent units attributed to said aromatic vinyl monomer (A) is 1–98 mol %, recurrent units attributed to ethylene (B) is 1–98 mol % and recurrent units attributed to said diene monomer having the styrenic vinyl group (C) is 0.001–10 mol %.

23. A method for producing an ethylene copolymer, comprising:

copolymerizing an aromatic vinyl monomer (A), ethylene (B) and a diene monomer having a styrenic vinyl group (C) using a catalyst formed of the following components (E), (F) and (G):

(E) a transition metal compound;

(F) an oxygen-containing compound represented by formula (2):

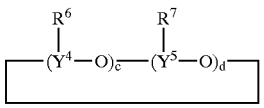

(2)

wherein, each of $R^6$ and $R^7$, which may be identical to or different from each other, represents a $C_1$–$C_8$ alkyl group; $Y^4$ and $Y^5$, which may be identical to or different from each other, represents a Group 13 element; and c and d independently represent numbers between 0 and 50 inclusive, with the proviso that c+d is equal to or greater than 1; and (G) an alkylating agent;

wherein said ethylene copolymer has in the molecular chain a vinyl group attributed to said diene monomer having the styrenic vinyl group;

wherein recurrent units attributed to said aromatic vinyl monomer (A) is 1–98 mol %, recurrent units attributed to ethylene (B) is 1–98 mol % and recurrent units attributed to said diene monomer having the styrenic vinyl group (C) is 0.001–10 mol %.

24. A method for producing an ethylene copolymer, comprising:

copolymerizing an aromatic vinyl monomer (A), ethylene (B) and a diene monomer having a styrenic vinyl group (C) using a catalyst formed of the following components (E), (F) and (G):

(E) a transition metal compound;

(F) a compound capable of forming an ionic complex through reaction with transition metal compound (E); and (G) an alkylating agent;

wherein said ethylene copolymer has in the molecular chain a vinyl group attributed to said diene monomer having the styrenic vinyl group;

wherein recurrent units attributed to said aromatic vinyl monomer (A) is 1–98 mol %, recurrent units attributed to ethylene (B) is 1–98 mol % and recurrent units attributed to said diene monomer having the styrenic vinyl group (C) is 0.001–10 mol %.

25. The method for producing an ethylene copolymer according to claim 16, wherein the transition metal compound (E) is represented by formula (3):

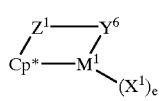

(3)

wherein $M^1$ represents titanium, zirconium, or hafnium; Cp* represents a cyclopentadienyl group or a substituted cyclopentadienyl group which is bonded to $M^1$ via a $\eta^5$ bonding mode, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, or a substituted octahydrofluorenyl group; $X^1$ represents σ ligand; e represents 1 or 2; a plurality of $X^1$ may be identical to or different from one another and may be linked together via an arbitrary group; $Y^6$ represents O, S, NR, PR, $CR_2$, or a neutral two-electron donor selected from OR, SR, $NR_2$, or $PR_2$; $Z^1$ represents $SiR_2$, $CR_2$, $SiR_2SiR_2$, $CR_2CR_2$, CR=CR, $CRSiR_2$, $GeR_2$, BR, or $BR_2$; R represents hydrogen, an alkyl group, an aryl group, a silyl group, a haloalkyl group, a haloaryl group, or a combination of at least two of the above groups selected so as to have 20 or fewer nonhydrogen atoms; and two or more of the above R may further form a condensed ring system with $Z^1$ or with $Y^6$ and $Z^1$.

* * * * *